US009762766B2

(12) United States Patent
Han

(10) Patent No.: US 9,762,766 B2
(45) Date of Patent: Sep. 12, 2017

(54) INFORMATION PROCESSING SYSTEM, INFORMATION PROCESSING APPARATUS, AND INFORMATION PROCESSING METHOD

(71) Applicant: Xiaofeng Han, Kanagawa (JP)

(72) Inventor: Xiaofeng Han, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/143,602

(22) Filed: May 1, 2016

(65) Prior Publication Data

US 2016/0337544 A1  Nov. 17, 2016

(30) Foreign Application Priority Data

May 11, 2015 (JP) .................................. 2015-096608
Apr. 25, 2016 (JP) .................................. 2016-087493

(51) Int. Cl.
*H04N 1/00* (2006.01)

(52) U.S. Cl.
CPC ..... *H04N 1/00938* (2013.01); *H04N 1/00244* (2013.01); *H04N 1/00392* (2013.01); *H04N 1/00474* (2013.01); *H04N 1/00933* (2013.01); *H04N 1/00973* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 2004/0148379 A1* | 7/2004 | Ogura ..................... H04L 29/06 709/223 |
| 2011/0239208 A1* | 9/2011 | Jung ......................... G06F 8/65 717/170 |
| 2011/0276960 A1 | 11/2011 | Nakamoto |
| 2013/0182282 A1 | 7/2013 | Nakayama et al. |
| 2013/0219261 A1 | 8/2013 | Han et al. |

FOREIGN PATENT DOCUMENTS

| JP | 2011-237881 | 11/2011 |
| JP | 2013-168113 | 8/2013 |
| JP | 2013-168130 | 8/2013 |

\* cited by examiner

*Primary Examiner* — Saeid Ebrahimi Dehkord
(74) *Attorney, Agent, or Firm* — Duft Bornsen & Fettig LLP

(57) ABSTRACT

An information processing system includes an information processing apparatus and a server. A acquisition unit of the apparatus acquires a first screen. A display unit of the apparatus displays the first screen. When a button to which an instruction is attached is pressed, a determination request information transmission unit of the apparatus transmits, to the server, determination request information requesting a validity determination to determine whether the application associated with the instruction can be used in the information processing apparatus. A reception unit of the apparatus receives, from the server, determination result information. When the determination result information indicates that the application associated with the instruction cannot be used, a first control unit of the apparatus performs control to update firmware. A determining unit of the server performs the validity determination. A determination result information transmission unit of the server transmits the determination result information to the information processing apparatus.

17 Claims, 19 Drawing Sheets

Installer://installApp?id=49354

| APPLICATION ID | MODULE ID | LOWER-LIMIT VERSION INFORMATION |
|---|---|---|
| xxx1 | yyy1 | z.01 |
| xxx2 | yyy2 | z.02 |
| xxx3 | yyy3 | z.03 |
| ⋮ | ⋮ | ⋮ |

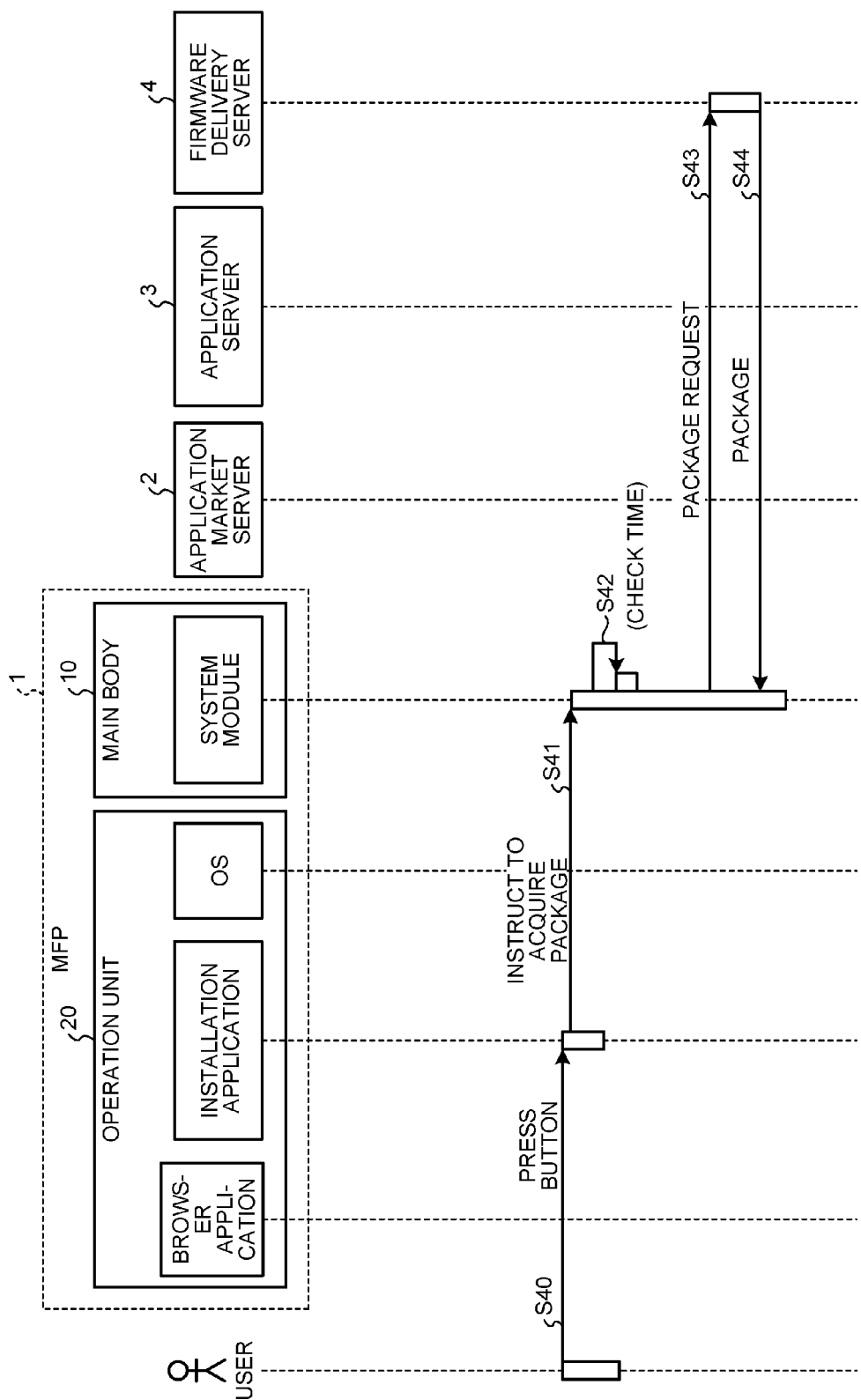

INFORMATION PROCESSING SYSTEM, INFORMATION PROCESSING APPARATUS, AND INFORMATION PROCESSING METHOD

CROSS-REFERENCE TO RELATED APPLICATIONS

The present application claims priority under 35 U.S.C. §119 to Japanese Patent Application No. 2015-096608 filed on May 11, 2015 and Japanese Patent Application No. 2016-087493 filed on Apr. 25, 2016. The contents of which are incorporated herein by reference in their entirety.

BACKGROUND OF THE INVENTION

1. Field of the Invention

The present invention relates to information processing systems, information processing apparatuses, and information processing methods.

2. Description of the Related Art

There has been known a system that allows an application to be downloaded and installed from a web page provided by a web server.

Japanese Unexamined Patent Application Publication No. 2011-237881, for example, discloses that an MFP is operatively associated with a delivery server that delivers software to thereby download and install software.

The typical technique, however, entails a possibility that an application downloaded from the web page and installed in the MFP may not be usable because of the application not being supported by current firmware that controls operation of the MFP (that refers to software that controls operation of the MFP). Hitherto, a service technician has visited a site at which the MFP is installed for performance of updating of the firmware that controls the operation of the MFP. Thus, unfortunately, a long wait time is needed before the application can be used and the typical technique offers poor user convenience.

SUMMARY OF THE INVENTION

According to one aspect of the present invention, an information processing system includes an information processing apparatus and a server connected to the information processing apparatus via a network. The information processing apparatus includes a first acquisition unit, a first display unit, a determination request information transmission unit, a determination result information reception unit, and a first control unit. The first acquisition unit acquires a first screen that includes a button to which an instruction to introduce an application to the information processing apparatus is attached. The first display unit performs control to display the first screen acquired by the first acquisition unit. When the button is pressed, the determination request information transmission unit transmits, to the server, determination request information that requests a validity determination to determine whether the application associated with the instruction is able to be used in the information processing apparatus, before execution of the instruction attached to the pressed button. The determination result information reception unit receives, from the server, determination result information that indicates a result of the validity determination. When the determination result information received by the determination result information reception unit indicates that the application associated with the instruction is not able to be used in the information processing apparatus, the first control unit performs control to update firmware that controls operation of the information processing apparatus. The server includes a determining unit and a determination result information transmission unit. The determining unit performs the validity determination when the determination request information is received from the information processing apparatus. The determination result information transmission unit transmits the determination result information that indicates a result of the validity determination to the information processing apparatus.

BRIEF DESCRIPTION OF THE DRAWINGS

FIG. 28 is a diagram illustrating exemplary operation steps of an information processing system according to the second embodiment.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
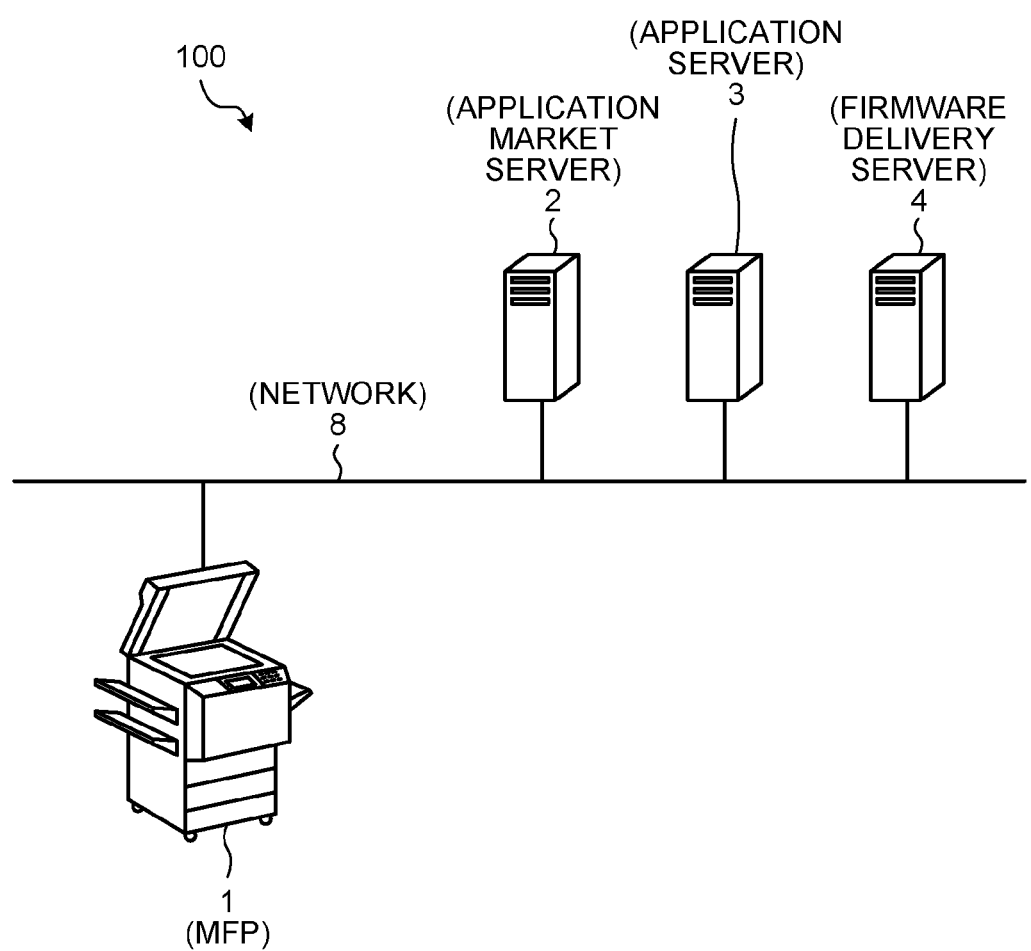
FIG. 1 is a schematic diagram illustrating an exemplary structure of an information processing system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of embodiments is to provide an information processing system, an information processing apparatus, and an information processing method that can enhance user convenience.

The following details an information processing system, an information processing apparatus, and an information processing method in embodiments according to the present invention with reference to the accompanying drawings. A multifunction peripheral (MFP) as one form of an image forming apparatus will hereunder be described as an exemplary information processing apparatus according to the present invention; however, the MFP is not the only possible form of the image processing apparatus. It is noted that the MFP has a plurality of functions, including a copier function, a scanner function, a printer function, and a facsimile function.

First Embodiment

FIG. 1 is a diagram illustrating an exemplary structure of an information processing system 100 according to a first embodiment. As illustrated in FIG. 1, the information processing system 100 includes an MFP 1, an application market server 2, an application server 3, and a firmware delivery server 4. The MFP 1, the application market server 2, the application server 3, and the firmware delivery server 4 are connected to each other via a network 8.

The application market server 2 provides the MFP 1 with an application list screen in which a plurality of applications are each associated with an installation instruction which is one example of instruction to introduce the corresponding application to the MFP 1. More specific details of the foregoing will follow later on. In the present example, an application that provides a function of acquiring the application list screen from the application market server 2 and displaying the application list screen on the MFP 1 (hereinafter, may be referred to as an "application market application") and an application that provides a function of controlling the introduction of an application selected by a user from among the applications displayed on the application list screen to the MFP 1 (hereinafter, may be referred to as an "installation application") have been installed in the MFP 1. The function of the application market application is achieved through the use of an application that provides web browser functions and thus the application market application may be collectively referred to as a "browser application". Specific details of the MFP 1 will follow later on.

The application server 3 performs a validity determination by which the application presented by the MFP 1 is determined to be usable on the MFP 1 (to be detailed later). Further, the application server 3 holds the applications displayed on the application list screen and delivers an application in response to a request from the MFP 1. The firmware delivery server 4 delivers firmware that controls operation of the MFP 1 in response to a request from the MFP 1. More specific details will follow later on.

Figure 2:
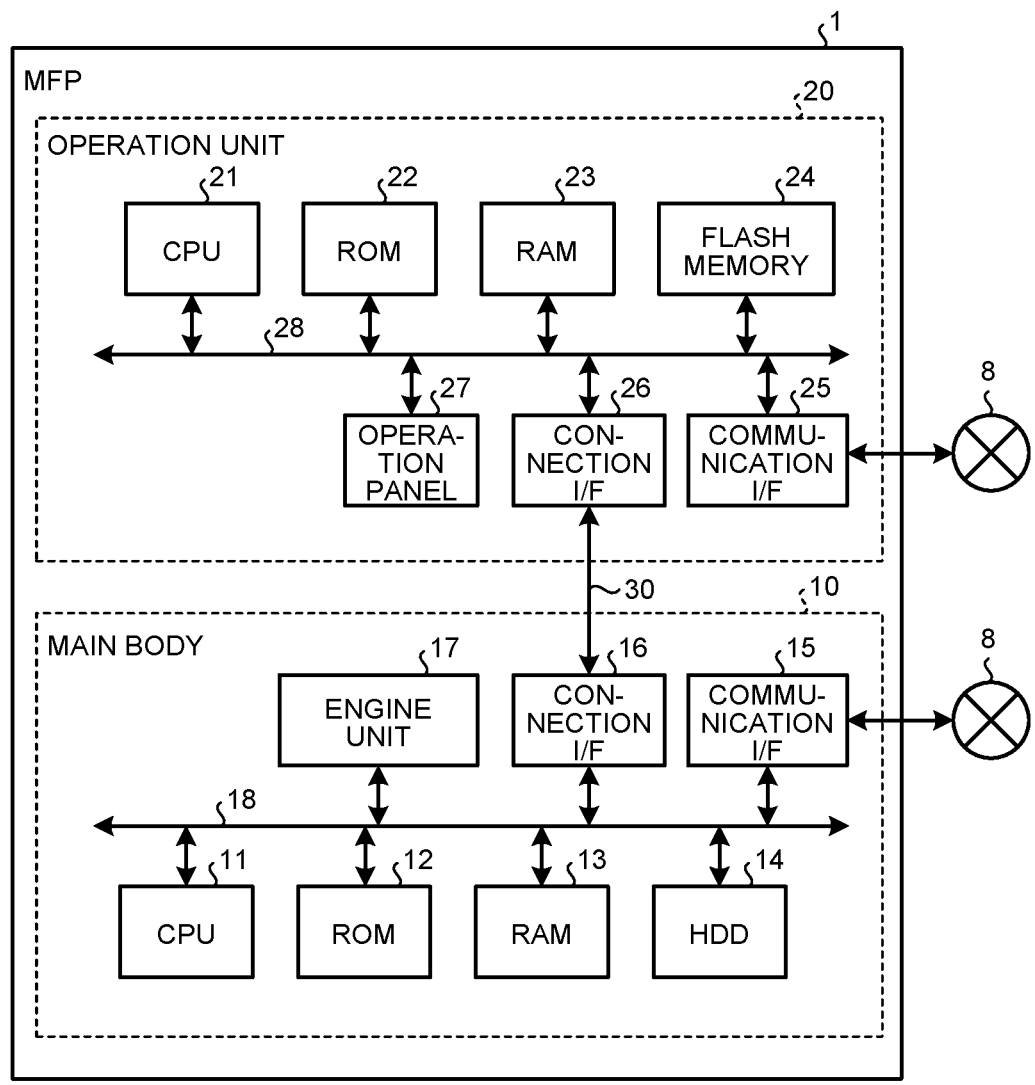
FIG. 2 is a diagram illustrating an exemplary hardware structure of an MFP.

The following describes a hardware structure of the MFP 1 with reference to FIG. 2. As illustrated in FIG. 2, the MFP 1 includes a main body 10 that can achieve various functions such as copier, scanner, facsimile, and printer functions, and an operation unit 20 that receives operation from the user. The reception of the user's operation is a concept in which information (including a signal indicating the coordinates on the screen) input in accordance with the user's operation is received. The main body 10 and the operation unit 20 are connected via a dedicated communication path 30 so as to enable communication with each other. The communication path 30 is compliant with a universal serial bus (USB) standard, for example. The communication path 30 may be compliant with any standard regardless of a wireless or wired communication scheme.

The main body 10 can operate in accordance with the operation received by the operation unit 20. The main body 10 can communicate with an external apparatus such as a client PC (personal computer) and also operate in accordance with an instruction received from the external apparatus.

The following describes a hardware structure of the main body 10. As illustrated in FIG. 2, the main body 10 includes a CPU 11, a ROM 12, a RAM 13, a hard disk drive (HDD) 14, a communication interface (I/F) 15, a connection I/F 16, and an engine unit 17. These components are connected with one another via a system bus 18.

The CPU 11 overall controls the operation of the main body 10. The CPU 11 executes a computer program stored in the ROM 12 or the HDD 14, for example, using the RAM 13 as a work area to control the overall operation of the main body 10, thereby achieving the various functions such as the copier, scanner, facsimile, and printer functions.

The communication I/F 15 is an interface to connect the main body 10 to the network 8. The connection I/F 16 is an interface that makes the main body 10 communicate with the operation unit 20 via the communication path 30.

The engine unit 17 is hardware that performs versatile information processing and processing other than communication for achieving the copier, scanner, facsimile, and printer functions. The engine unit 17 includes a scanner (image reading section) that scans and reads an image on a document, a plotter (image forming section) that performs printing on a sheet material such as a sheet, and a facsimile section that performs facsimile communication, for example. The engine unit 17 may further include specific options such as a finisher that sorts the sheet materials after printing and an automatic document feeder (ADF) that automatically feeds documents.

The following describes a hardware structure of the operation unit 20. As illustrated in FIG. 2, the operation unit 20 includes a CPU 21, a ROM 22, a RAM 23, a flash memory 24, a communication I/F 25, a connection I/F 26, and an operation panel 27. These components are connected with one another via a system bus 28.

The CPU 21 overall controls the operation of the operation unit 20. The CPU 21 executes a computer program stored in the ROM 22 or the flash memory 24, for example, using the RAM 23 as a work area to control the overall operation of the operation unit 20, thereby achieving various functions such as displaying of information (images) according to the input received from the user, which are described later.

The communication I/F 25 is an interface to connect the operation unit 20 to the network 8. The connection I/F 26 is an interface that makes the operation unit 20 communicate with the main body 10 via the communication path 30.

The operation panel 27 receives various types of input according to the user's operation and displays various types of information (e.g., information according to the received operation, information indicating an operation status of the MFP 1, and information indicating a setting condition). While in this example, the operation panel 27 includes a liquid crystal display (LCD) having a touch panel function, the embodiment is not limited thereto. For example, the operation panel 57 may include an organic electroluminescence (EL) display having a touch panel function. Furthermore, the operation panel 27 may be provided with an operation unit such as hardware keys and a display unit such as a lamp.

Figure 3:
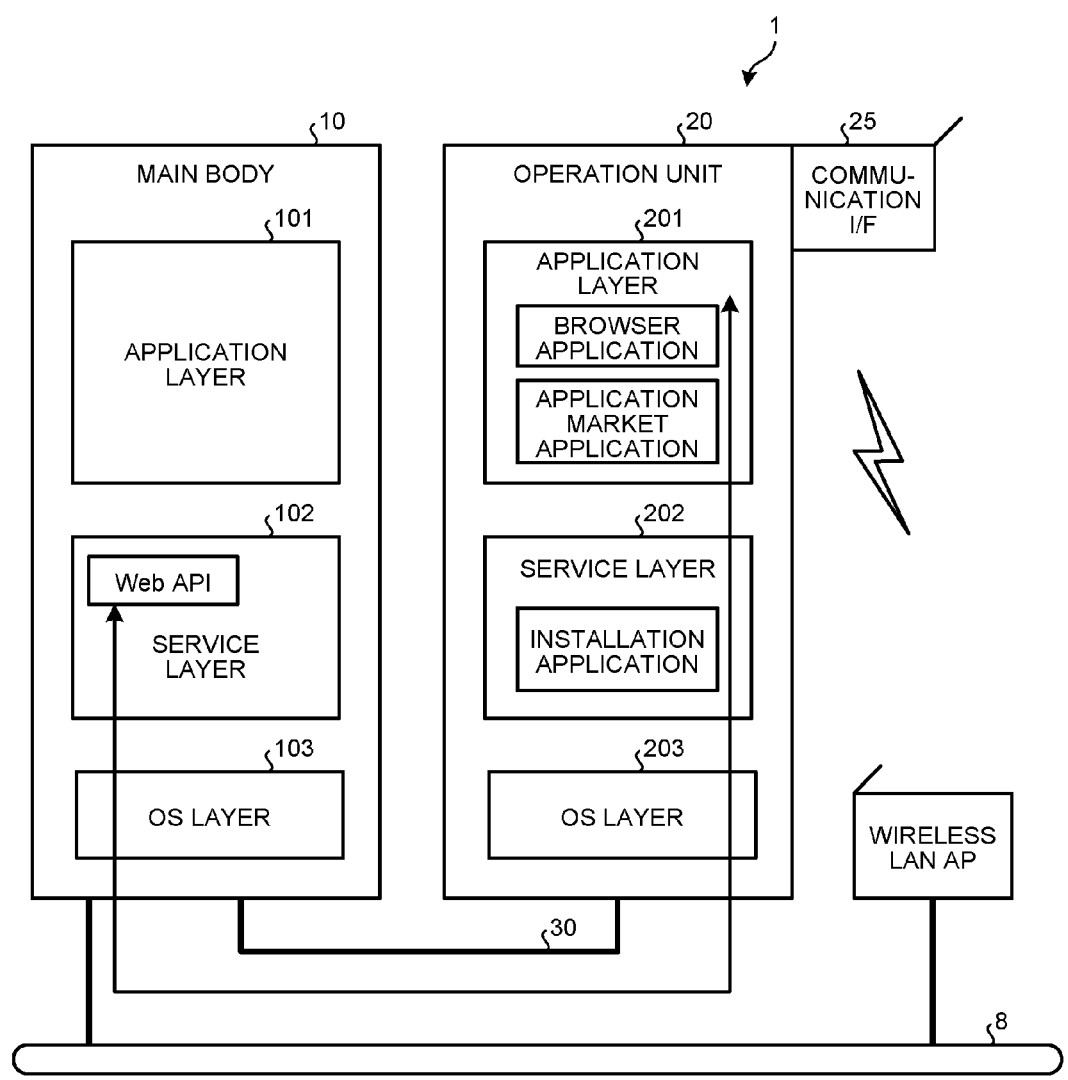
FIG. 3 is a diagram illustrating an exemplary software structure of the MFP.

The following describes a software structure of the MFP 1. FIG. 3 is a schematic diagram illustrating an exemplary software structure of the MFP 1. As illustrated in FIG. 3, the main body 10 includes an application layer 101, a service layer 102, and an OS layer 103. The application layer 101, the service layer 102, and the OS layer 103 are in fact various types of software stored in the ROM 12 and the HDD 14, for example. The CPU 11 executes the various types of software to provide the various functions.

The application layer 101 is application software (in the following description, may be described simply as the "application") that causes the hardware resources to operate and provide a certain function. Examples of the application include a copy application that provides the copier function, a scanner application that provides the scanner function, a facsimile application that provides the facsimile function, and a printer application that provides the printer function.

The service layer 102, which is present between the application layer 101 and the OS layer 103, is software that provides an interface to the applications for using the hardware resources included in the main body 10. More specifically, the service layer 102 receives requests to operate the hardware resources and provides a function to arbitrate the operation requests. Examples of the operation requests received by the service layer 102 include a request for the scanner to perform reading and a request for the plotter to perform printing.

The interface function of the service layer 102 is provided to not only the application layer 101 of the main body 10 but also an application layer 201 of the operation unit 20. The application layer 201 (application) of the operation unit 20, thus, can also achieve the functions using the hardware resources (e.g., the engine unit 17) of the main body 10 via the interface function of the service layer 102. For example, the interface function of the service layer 102 is provided through a web API.

The OS layer 103 is basic software (operating system (OS)) that provides a basic function to control the hardware included in the main body 10. The service layer 102, which is software, converts requests to use the hardware resources from the various applications into commands that the OS layer 103 can interpret, and then transfers the commands to the OS layer 103. The OS layer 103, which is software, executes the commands. As a result, the hardware resources operate in accordance with the requests from the applications.

The operation unit 20 includes the application layer 201, a service layer 202, and an OS layer 203. The hierarchical structure among the application layer 201, the service layer 202, and the OS layer 203 of the operation unit 20 is the same as that of the main body 10. The function provided by the application of the application layer 201 and the type of the operation request that the service layer 202 can receive differ from those in the main body 10. Although the application of the application layer 201 may be software that operates the hardware resource included in the operation unit 20 to provide a certain function, the application of the application layer 201 is software that mainly provides a function of a user interface (UI) to operate or display the functions (copier, scanner, facsimile, and printer functions) included in the main body 10. In the present example, applications in the application layer 201 include the browser application (application market application). The software of the service layer 202 includes the installation application.

In the embodiment, the software of the OS layer 103 of the main body 10 and the software of the OS layer 203 of the operation unit 20 differ from each other in order to keep independence between the functions of the main body 10 and the operation unit 20. The main body 10 and the operation unit 20, thus, operate independently from each other under the different operating systems. For example, Linux (registered trademark) may be adopted for the software of the OS layer 103 of the main body 10 while Android (registered trademark) may be adopted for the software of the OS layer 203 of the operation unit 20.

As described above, the main body 10 and the operation unit 20 operate under different operating systems in the MFP 1 according to the embodiment. The communication between the main body 10 and the operation unit 20, thus, is not performed as an inter-process communication in the common apparatus, but as a communication between different apparatuses. Examples of the communication performed as that between different apparatuses include the operation (command communication) that transmits the information (a content of the instruction from the user) received by the operation unit 20 to the main body 10, and the operation of the main body 10 to notify the operation unit 20 of an event. The operation unit 20, thus, can use the functions of the main body 10 by performing the command communication with the main body 10. Examples of an event of which the operation unit 20 is notified by the main body 10 include an implementation state of the operation in the main body 10 and contents set by the main body 10.

In the embodiment, power is supplied to the operation unit 20 from the main body 10 via the communication path 30, thereby making it possible to perform power supply control separately (independently) for the operation unit 20 and the main body 10.

Figure 4:
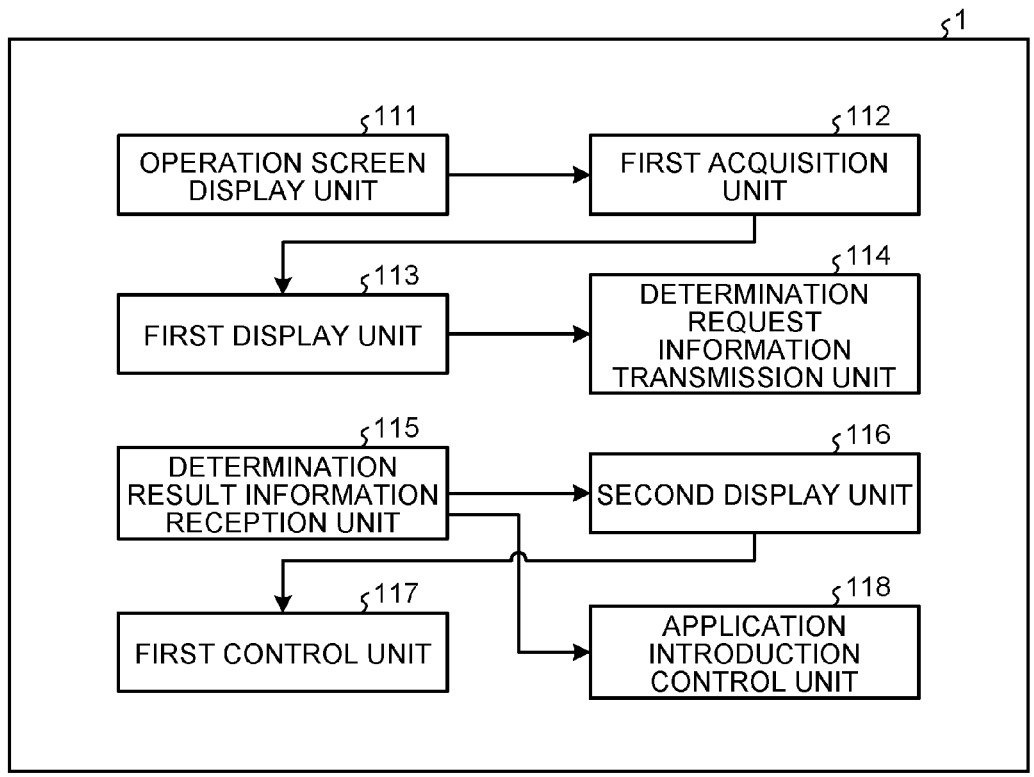
FIG. 4 is a diagram illustrating exemplary functions of the MFP according to a first embodiment.

The following describes the functions of the MFP 1. FIG. 4 is a diagram illustrating exemplary functions the MFP 1 has. As illustrated in FIG. 4, the MFP 1 includes an operation screen display unit 111, a first acquisition unit 112, a first display unit 113, a determination request information transmission unit 114, a determination result information reception unit 115, a second display unit 116, a first control unit 117, and an application introduction control unit 118. For convenience sake, FIG. 4 mainly illustrates functions relating to the present invention. Understandably, however, the MFP 1 may include additional functions.

Figure 5:
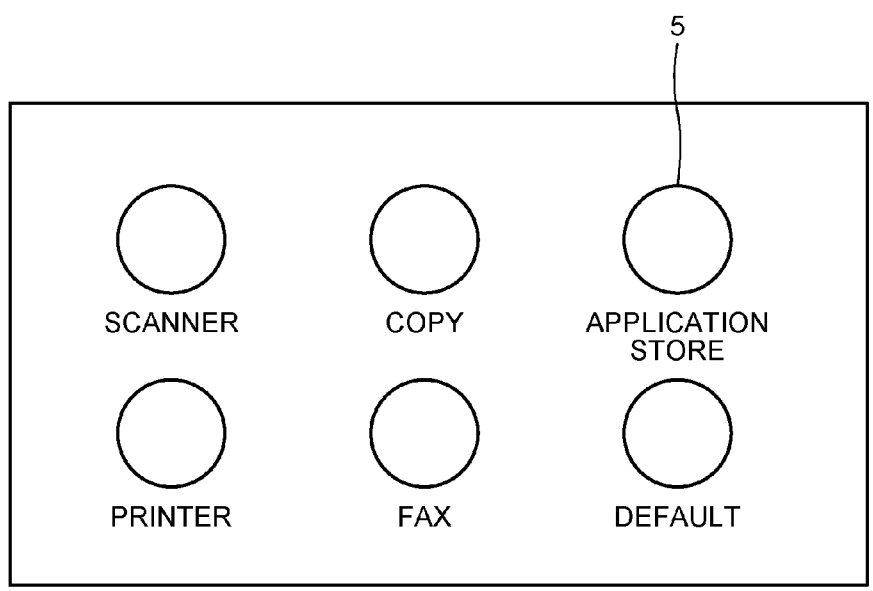
FIG. 5 is a diagram illustrating an exemplary operation screen.

The operation screen display unit 111 controls display on the operation panel 27 of operation screens for performing various types of operation. FIG. 5 is a diagram illustrating an exemplary operation screen. The operation screen displays an icon 5 that starts the application market application.

The following further describes FIG. 4. The first acquisition unit 112 acquires a first screen that includes an instruction to introduce an application to the MFP 1. In the first embodiment, the first acquisition unit 112 acquires, from the application market server 2, the application list screen that lists a plurality of applications, each of the applications being associated with an instruction to install the application (installation instruction). In the first embodiment, the user's touching the icon 5 causes the browser application (first acquisition unit 112) to transmit a signal that requests the application list screen (hereinafter, it may be referred to as a "display request".) to the application market server 2. The application list screen is acquired from the application market server 2 as a response to the foregoing display request.

Figures 6, 7:
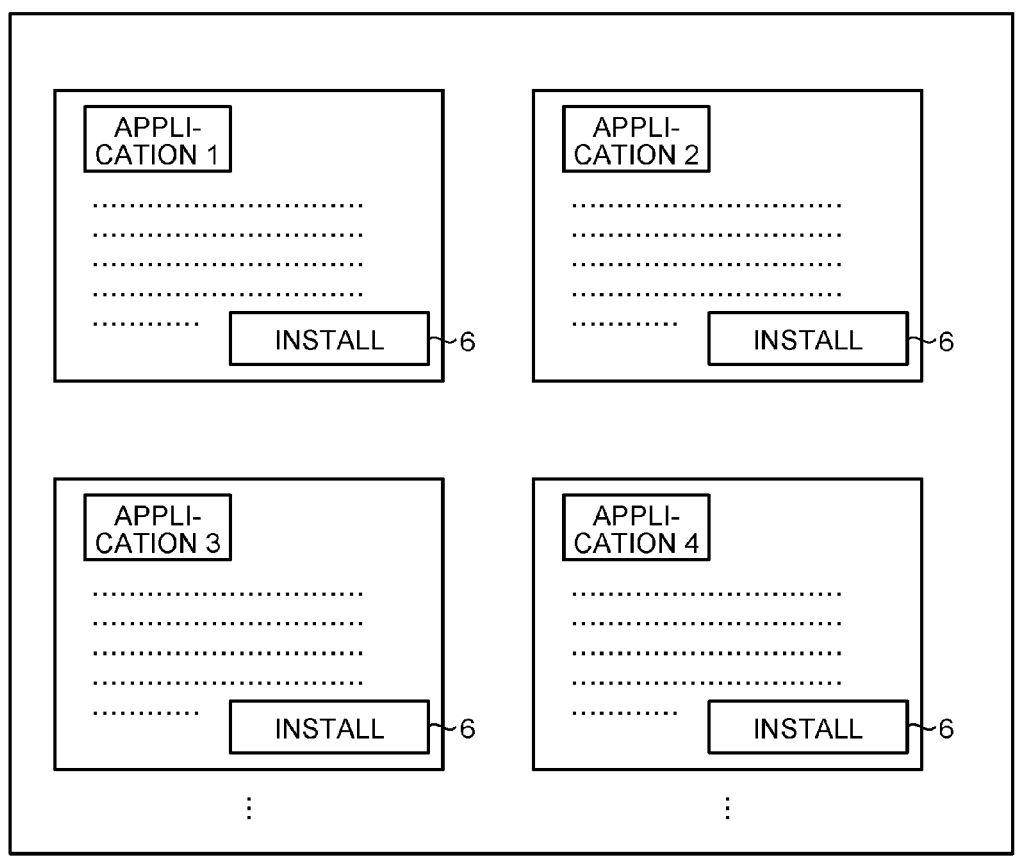
FIG. 6 is a diagram illustrating an exemplary application list screen.
FIG. 7 is a diagram illustrating an exemplary URL scheme installation instruction.

FIG. 6 is a diagram illustrating an exemplary application list screen (web page). In the example illustrated in FIG. 6, the application list screen displays, for each of the applications, descriptive information that describes details of the application and a button 6 (hereinafter referred to as an "installation button 6") used for instructing to install the application. In the present example, a URL scheme that describes a procedure to execute the installation instruction is attached to the installation button 6.

FIG. 7 is a diagram illustrating an exemplary URL scheme attached to the installation button 6 associated with the application that is identified by an ID of "49354" (application ID). The portion of "Installer" in FIG. 7 is a header portion of the URL scheme. The header portion of the URL scheme may hereinafter be referred to as a "scheme portion". The scheme portion of "Installer" represents information for identifying the application for which the installation instruction is to be executed. In the present example, the scheme portion of "Installer" represents the installer loaded in the MFP1. Additionally, the portion of "installApp" of "installApp?id=49354" in FIG. 7 is an installation instruction, and an argument of the installation instruction is "id=49354". Specifically, the portion of "installApp?id=49354" represents the installation instruction for the application that is identified by an id of "49354". That is, the portion of "installApp?id=49354" indicates specific details of the instruction. The URL scheme illustrated in FIG. 7 is information that describes the installation instruction execution procedure in URL format. In response to a press of the installation button 6, the installer is started and the installer thus started executes the instruction to install the application identified by the id of "49354".

The application list screen in the first embodiment may be considered as a screen that includes a button (in the present example, the installation button 6) to which an instruction to introduce an application to the MFP is attached. The application list screen corresponds to a "first screen" in the claims.

The following further describes FIG. 4. The first display unit 113 performs control to display the first screen acquired by the first acquisition unit 112. In the first embodiment, the first display unit 113 performs control to display on the operation panel 27 the application list screen acquired by the first acquisition unit 112.

When a button (installation button 6) included in the first screen is pressed, before execution of the instruction (installation instruction) attached to the pressed button, the determination request information transmission unit 114 transmits, to the application server 3, determination request information that requests a validity determination to be performed to determine whether the application associated with the instruction (the selected instruction) can be used in the MFP 1. The browser application according to the first embodiment, upon receipt of a press of the installation button 6 that is associated with a specific application out of the applications displayed in the application list screen, notifies the OS of the operation unit 20 of the URL scheme attached to the specific installation button 6. The OS of the operation unit 20 confirms the notified URL scheme and broadcasts the URL scheme to the respective applications of the operation unit 20. Before the installation application reacts to the broadcast URL scheme to thereby execute the installation instruction the procedure of which is described by the URL scheme, the determination request information that requests the validity determination to be performed to determine whether the application to be installed (application associated with the installation instruction) can be used in the MFP 1 is transmitted to the application server 3.

In the present example, the press of the installation button 6 means the selection of the URL scheme attached to the installation button 6 and thus means the selection of the installation instruction the execution procedure of which is described by the URL scheme. Specifically, when the installation button 6 included in the application list screen is pressed, before execution of the installation instruction (installation instruction attached to the installation button 6) the execution procedure of which is described by the URL scheme, the installation application (determination request information transmission unit 114) transmits, to the application server 3, the determination request information that requests the validity determination to be performed to determine whether the application associated with the instruction can be used in the MFP 1. In the present example, the application server 3 corresponds to a "server" in the claims.

The above-described determination request information includes application identification information, module identification information, and version information. Specifically, the application identification information identifies the application (to be installed) associated with the installation instruction attached to the pressed installation button 6. The module identification information identifies a module that provides a function required for using the application. The version information indicates a version value of the module loaded in the MFP 1. The "module" as used herein represents a unit of software for providing a specific function. The "version value" as used herein indicates an attribute of the corresponding module and becomes greater with a greater number of modifications made of the corresponding module.

The determination request information in the first embodiment includes an application ID (one example of application identification information) of the application associated with the installation instruction attached to the pressed installation button 6. Additionally, the determination request information in the first embodiment includes module information in which each of module IDs (one example of module identification information) having one-to-one correspondence to respective modules loaded in the MFP 1 is associated with the module identified by the module ID with the version information that indicates the version value of the module. The configuration of the determination request information is not, however, limited to the foregoing. For example, the determination request information may be information including an application ID of the application associated with the selected installation instruction (in the present example, the application ID included in the URL scheme), a module ID that identifies a specific module for providing the function required for using the application identified by the application ID, and version information that indicates the version value of the module that is loaded in the MFP 1 and that is identified by the module ID, but not including a module ID identifying a module that is not required for using the application identified by the application ID and version information that indicates a version value of the module.

Figure 8:
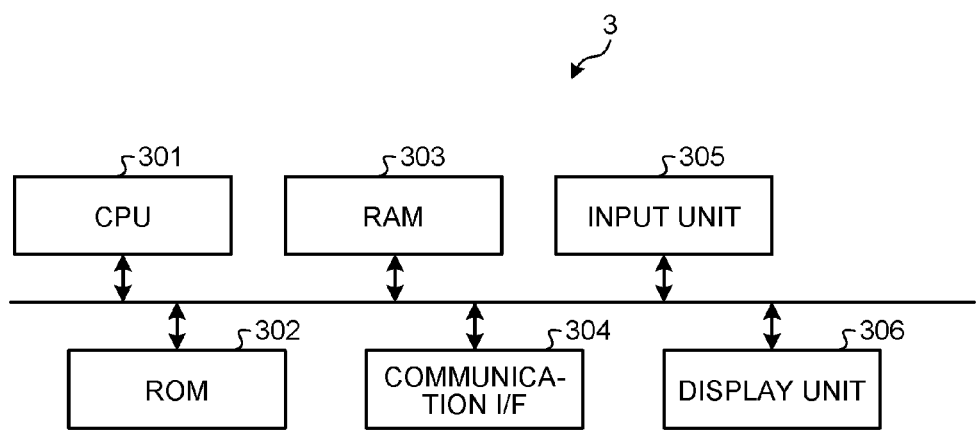
FIG. 8 is a diagram illustrating an exemplary hardware structure of an application server.

The following describes a structure of the application server 3 that performs the validity determination. FIG. 8 is a diagram illustrating an exemplary hardware structure of the application server 3. It is noted that the application market server 2 and the firmware delivery server 4 each have the same structure as the structure illustrated in FIG. 8.

As illustrated in FIG. 8, the application server 3 includes a CPU 301, a ROM 302, a RAM 303, a communication I/F 304, an input unit 305, and a display unit 306. The CPU 301 overall controls operation of the application server 3. The ROM 302 is a non-volatile memory and stores therein computer programs and various other types of data. The RAM 303 is a volatile memory that functions as a work area for various types of processing performed by the CPU 301. The communication I/F 304 is an interface to connect the application server 3 to the network 8. The input unit 305 is a device, such as a keyboard and a mouse, with which the user performs input operation. The display unit 306 is a device, such as a liquid crystal display device, on which various types of information are displayed.

Figure 9:
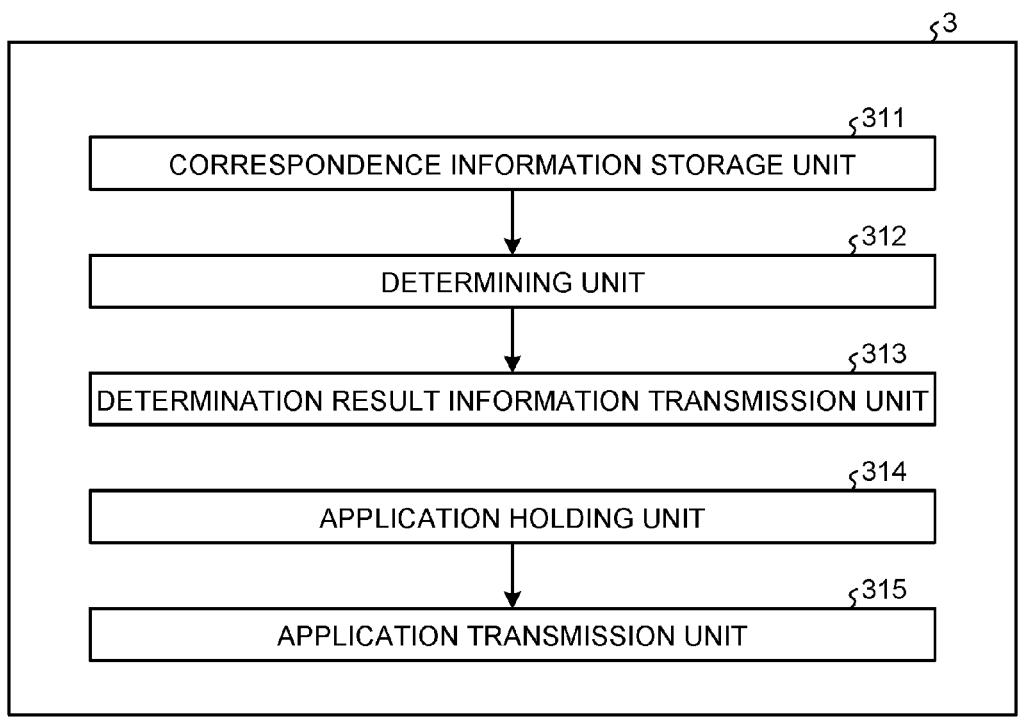
FIG. 9 is a diagram illustrating exemplary functions of the application server.

FIG. 9 is a diagram illustrating exemplary functions the application server 3 has. As illustrated in FIG. 9, the application server 3 includes a correspondence information storage unit 311, a determining unit 312, a determination result information transmission unit 313, an application holding unit 314, and an application transmission unit 315. For convenience sake, FIG. 9 mainly illustrates functions relating to main components of the present invention. Understandably, however, the application server 3 may include additional functions.

Figures 10, 11:
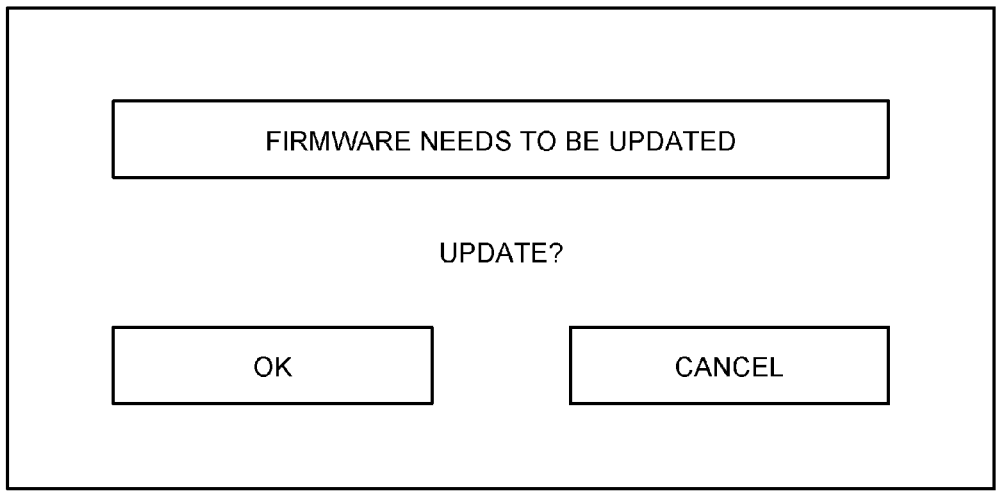
FIG. 10 is a diagram illustrating exemplary correspondence information.
FIG. 11 is a diagram illustrating an exemplary second screen.

The correspondence information storage unit 311 stores therein correspondence information. The correspondence information represents information that associates, for each of a plurality of pieces of application identification information (in the present example, the application IDs) having one-to-one correspondence to respective applications, the module identification information that identifies the module for providing the function required for using the application identified by the application identification information (in the present example, the module ID) with lower-limit version information that indicates a minimum version value of the module identified by the module identification information (the minimum version value required for using the corresponding application). FIG. 10 is a diagram illustrating exemplary correspondence information.

The following further describes FIG. 9. The determining unit 312 performs the validity determination when the determination request information is received from the MFP 1. Specifically, the determining unit 312 determines whether the application identified by the application ID included in the determination request information can be used in the MFP 1 based on the aforementioned determination request information received from the MFP 1 and the correspondence information stored in the correspondence information storage unit 311. To be more specific, the determining unit 312 identifies, out of combinations of pieces of application identification information and pieces of module identification information included in the correspondence information, a specific combination that matches a combination of the application identification information and the module identification information included in the determination request information. When the version value indicated by the lower-limit version information that is associated with the identified combination is greater than the version value indicated by the version information included in the determination request information, the determining unit 312 determines that the application that is identified by the application identification information included in the determination request information cannot be used in the MFP 1. When the version value indicated by the lower-limit version information is equal to or smaller than the version value indicated by the version information included in the determination request information, the determining unit 312 determines that the application that is identified by the application identification information included in the determination request information can be used in the MFP 1.

The following describes a process for the validity determination in the first embodiment. The validity determination process is illustrative only and is not intended to be in any way limiting. When the determination request information is received from the MFP 1, the determining unit 312 identifies, out of a plurality of application IDs included in the correspondence information, a specific application ID that matches the application ID included in the determination request information. The determining unit 312 identifies, in the correspondence information, a specific module ID that is associated with the identified application ID. Then, from among a plurality of module IDs that are included in the module information (the information that associates the version information with each of the module IDs having one-to-one correspondence to the respective modules loaded in the MFP 1) that is included in the determination request information, the determining unit 312 selects a specific module ID that matches the identified module ID (for convenience sake, the module ID thus selected will be referred to as the "selected module ID".). Then, in the module information, the determining unit 312 selects a specific piece of version information that is associated with the selected module ID (for convenience sake, the version information thus selected will be referred to as the "selected version information".). The determining unit 312 identifies, out of combinations of the application IDs and the module IDs included in the correspondence information, a specific combination that matches the combination of the application ID included in the determination request information and the selected module ID. When the version value indicated by the lower-limit version information that is associated with the identified combination is greater than the version value indicated by the selected version information, the determining unit 312 determines that the application that is identified by the application ID included in the determination request information cannot be used in the MFP 1. When the version value indicated by the lower-limit version information is equal to or smaller than the version value indicated by the selected version information, the determining unit 312 determines that the application that is identified by the application ID included in the determination request information can be used in the MFP 1.

The determination result information transmission unit 313 illustrated in FIG. 9 transmits determination result information that indicates a result of the validity determination described above to the MFP 1. The application holding unit 314 holds a plurality of applications. The application transmission unit 315 transmits an application held by the application holding unit 314 to the MFP 1 in response to a request from the MFP 1. The above is the structure of the application server 3.

In the first embodiment, the functions of the respective units (including the determining unit 312, the determination result information transmission unit 313, and the application transmission unit 315) of the application server 3 are achieved by the CPU 301 executing a computer program stored in, for example, the ROM 302. The functions are not, however, limited to being achieved as described above. At least a part of the functions of the respective units of the application server 3 may be achieved by a dedicated hardware circuit (e.g., a semiconductor integrated circuit), for example. Additionally, the correspondence information storage unit 311 and the application holding unit 314 described above may be achieved by, for example, the ROM 302. It is noted that the function of each of the determination result information transmission unit 313 and the application transmission unit 315 may be considered to be achieved through the combination of the CPU 301 that executes the computer program and the communication I/F 304. For example, the function of the determination result information transmission unit 313 is achieved by the CPU 301 controlling the communication I/F 304 such that the determination result information is transmitted to the MFP 1. The function of the application transmission unit 315 is achieved by the CPU 301 controlling the communication I/F 304 such that the application is transmitted to the MFP 1.

The following further describes FIG. 4. The determination result information reception unit 115 receives, from the application server 3, the determination result information that indicates the result of the validity determination described above as a response to the determination request information described above.

When the determination result information received by the determination result information reception unit 115 indicates that the application that is associated with the installation instruction attached to the pressed installation button 6 (that is, the application that is identified by the application ID included in the determination request information) cannot be used in the MFP 1, the second display unit 116 performs control to display a second screen for receiving an instruction as to whether to update firmware. In the first embodiment, the second display unit 116 performs control to display, on the operation panel 27, the second screen as illustrated in FIG. 11. In the present example, the user presses an "OK" button illustrated in FIG. 11 to instruct to update the firmware.

The following further describes FIG. 4. When the determination result information received by the determination result information reception unit 115 indicates that the application that is associated with the installation instruction attached to the pressed installation button 6 (the application identified by the application ID included in the determination request information) cannot be used in the MFP 1, the first control unit 117 performs control to update the firmware that controls operation of the MFP 1. In the present example, when an instruction to update the firmware is received via the second screen, the first control unit 117 performs control to update the firmware.

Figure 12:
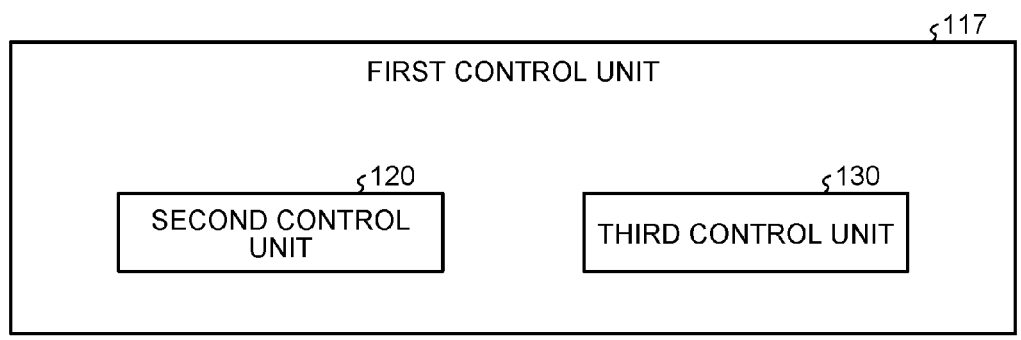
FIG. 12 is a diagram illustrating exemplary functions of a first control unit.

In the first embodiment, when the determination result information received by the determination result information reception unit 115 indicates that the application that is associated with the installation instruction attached to the pressed installation button 6 (the application identified by the application ID included in the determination request information) cannot be used in the MFP 1, the first control unit 117 performs control to introduce first firmware indicative of the latest version of firmware to the MFP 1. In the first embodiment, the first firmware includes second firmware that indicates the latest version of operation unit firmware for controlling operation of the operation unit 20 and third firmware that indicates the latest version of main body firmware for controlling operation of the main body 10. In addition, the first control unit 117 includes, as illustrated in FIG. 12, a second control unit 120 and a third control unit 130. The second control unit 120 performs control to introduce the second firmware to the operation unit 20. The third control unit 130 performs control to introduce the third firmware to the main body 10.

Figure 13:
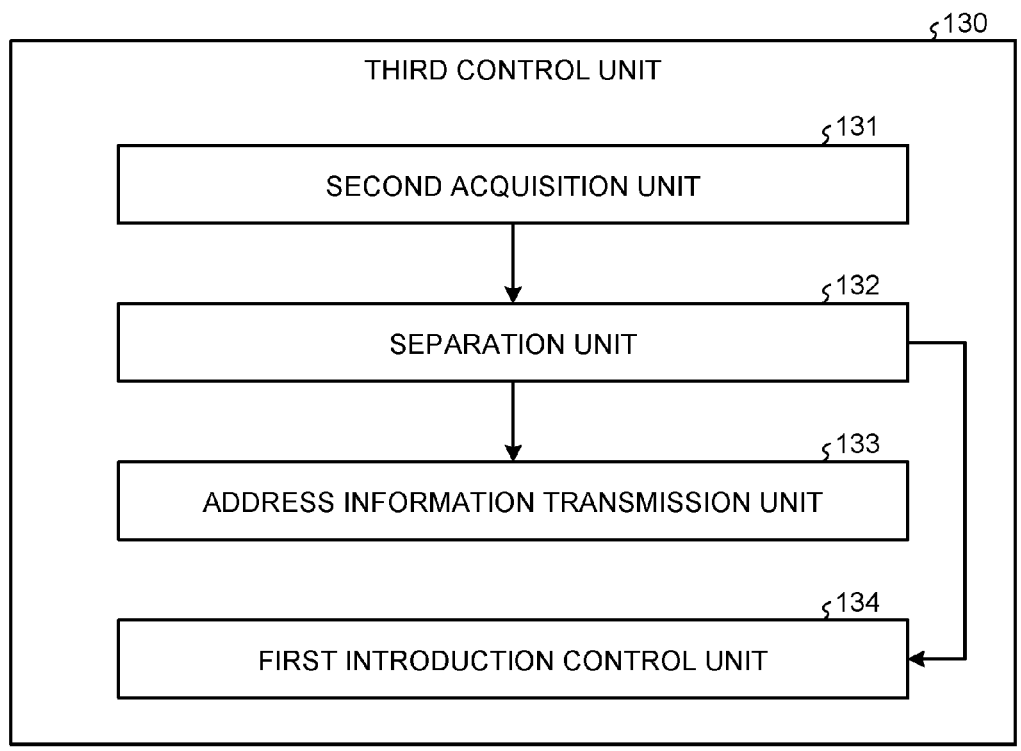
FIG. 13 is a diagram illustrating exemplary functions of a third control unit.

For convenience sake, functions of the third control unit 130 will first be described before functions of the second control unit 120. FIG. 13 is a diagram illustrating exemplary functions of the third control unit 130. As illustrated in FIG. 13, the third control unit 130 includes a second acquisition unit 131, a separation unit 132, an address information transmission unit 133, and a first introduction control unit 134.

The second acquisition unit 131 acquires a package in which the second firmware and the third firmware are combined (specifically, the package in which the latest version of operation unit firmware and the latest version of main body firmware are combined; may be referred in the following to a "latest version of package"). The second acquisition unit 131 stores the package thus acquired in a storage unit (the HDD 14 in the present example). In the first embodiment, in accordance with an instruction from an instruction unit 121 to be described later, the second acquisition unit 131 transmits a package request that requests the latest version of package to the firmware delivery server 4 and, as a response to the package request, acquires the latest version of package from the firmware delivery server 4.

The separation unit 132 separates the latest version of package acquired by the second acquisition unit 131 into the second firmware and the third firmware. Any of various well-known methods may be used for separating the package.

The address information transmission unit 133 transmits, to the second control unit 120, address information that can identify a specific region (storage region) in which the second firmware is stored (the information that indicates the location of the second firmware in the HDD 14) in the storage unit (the HDD 14 in the present example).

The first introduction control unit 134 performs control to introduce the third firmware separated by the separation unit 132 to the main body 10. In the present example, the first introduction control unit 134 performs control to install the third firmware in the main body 10. More specifically, the first introduction control unit 134 loads program and data files that constitute the third firmware and makes necessary settings. The first introduction control unit 134 restarts the main body 10 to make necessary settings for a file that cannot be altered while the OS is operating.

Figure 14:
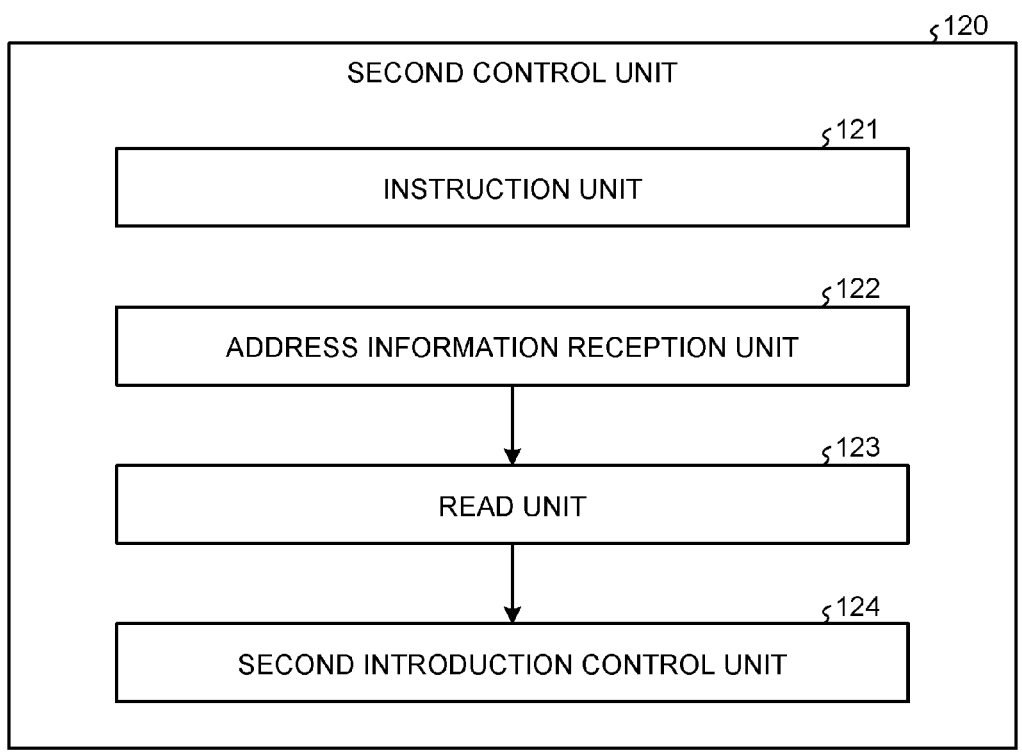
FIG. 14 is a diagram illustrating exemplary functions of a second control unit.

The following describes the functions of the second control unit 120. FIG. 14 is a diagram illustrating exemplary functions of the second control unit 120. As illustrated in FIG. 14, the second control unit 120 includes the instruction unit 121, an address information reception unit 122, a read unit 123, and a second introduction control unit 124.

When the determination result information received by the determination result information reception unit 115 indicates that the application that is associated with the installation instruction attached to the pressed installation button 6 (the application identified by the application ID included in the determination request information) cannot be used in the MFP 1, the instruction unit 121 instructs the third control unit 130 (second acquisition unit 131) to acquire the latest version of package.

The address information reception unit 122 receives the address information from the third control unit 130. The read unit 123 reads the second firmware from the region that is identified by the address information received by the address information reception unit 122 in the storage unit (HDD 14 in the present example).

The second introduction control unit 124 performs control to introduce the second firmware read by the read unit 123 to the operation unit 20. In the present example, the second introduction control unit 124 performs control to install the second firmware in the operation unit 20. More specifically, the second introduction control unit 124 loads program and data files that constitute the second firmware and makes necessary settings. The second introduction control unit 124 restarts the operation unit 20 to make necessary settings for a file that cannot be altered while the OS is operating.

In the first embodiment, the operation unit 20 includes the second control unit 120 and the main body 10 includes the third control unit 130.

As described above, when the determination result information received by the determination result information reception unit 115 indicates that the application that is associated with the installation instruction attached to the pressed installation button 6 cannot be used in the MFP 1, the first control unit 117 performs control to introduce the first firmware that indicates the latest version of firmware to the MFP 1. Following the control performed by the first control unit 117, the determination request information transmission unit 114 retransmits the determination request information to the application server 3, so that the foregoing process is repeated.

Figure 15:
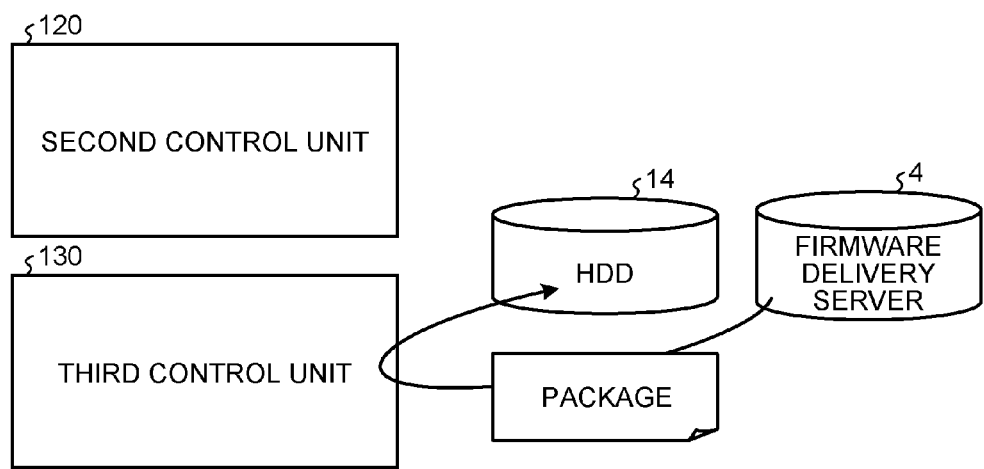
FIG. 15 is a diagram for illustrating a firmware updating process.

The following describes a firmware updating process with reference to FIGS. 15 to 19. As illustrated in FIG. 15, in accordance with an instruction from the second control unit 120 (instruction unit 121), the third control unit 130 (second acquisition unit 131) acquires the latest version of package from the firmware delivery server 4 and stores the acquired package in the HDD 14.

Figure 16:
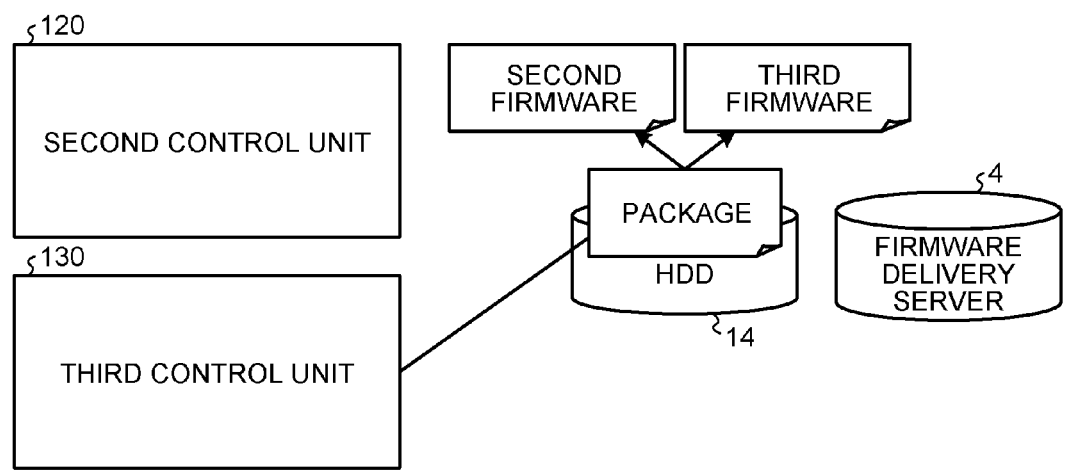
FIG. 16 is a diagram for illustrating the firmware updating process.

As illustrated in FIG. 16, the third control unit 130 (separation unit 132) separates the package stored in the HDD 14 into the second firmware and the third firmware.

Figure 17:
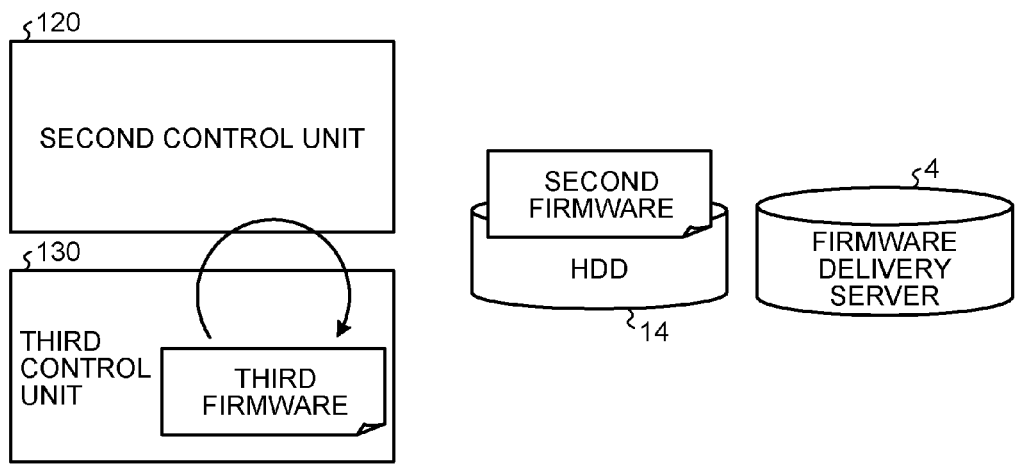
FIG. 17 is a diagram for illustrating the firmware updating process.

As illustrated in FIG. 17, the third control unit 130 (first introduction control unit 134) loads program and data files that constitute the third firmware and makes necessary settings. At this stage, the main body 10 is not restarted.

Figure 18:
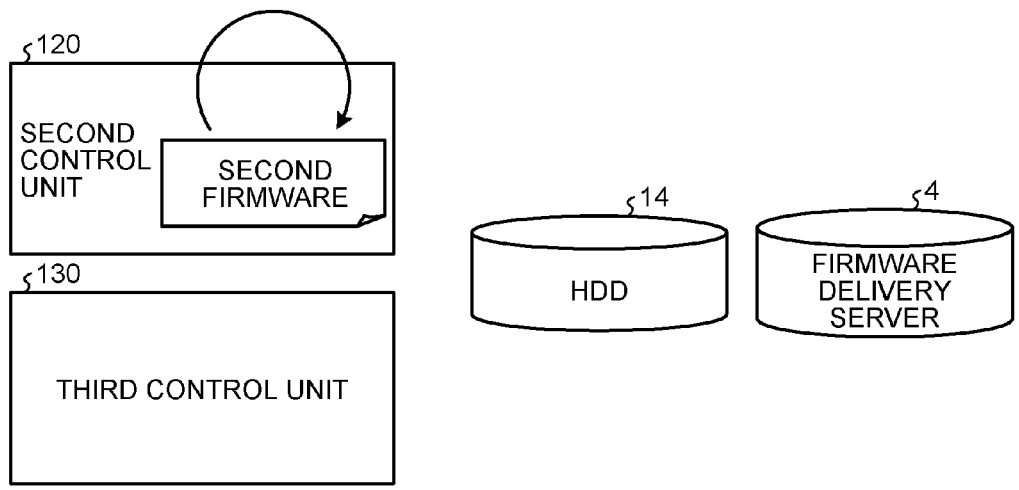
FIG. 18 is a diagram for illustrating the firmware updating process.

The third control unit 130 instructs the second control unit 120 to introduce the second firmware (instructs to update the operation unit firmware). In the present example, the third control unit 130 (address information transmission unit 133) transmits, to the second control unit 120, the address information that can identify the region in which the second firmware is stored in the HDD 14. This transmission of the address information constitutes the instruction to introduce the second firmware. The second control unit 120 (read unit 123) reads the second firmware from the region that is identified by the address information received from the third control unit 130 in the HDD 14. Then, as illustrated in FIG. 18, the second control unit 120 (second introduction control unit 124) loads program and data files that constitute the second firmware and makes necessary settings. When the settings for files other than the files that cannot be altered while the OS is operating are completed, the operation unit 20 is restarted and settings are made for those files that cannot be altered while the OS is operating. This final step completes the introduction of the second firmware to the operation unit 20.

Figure 19:
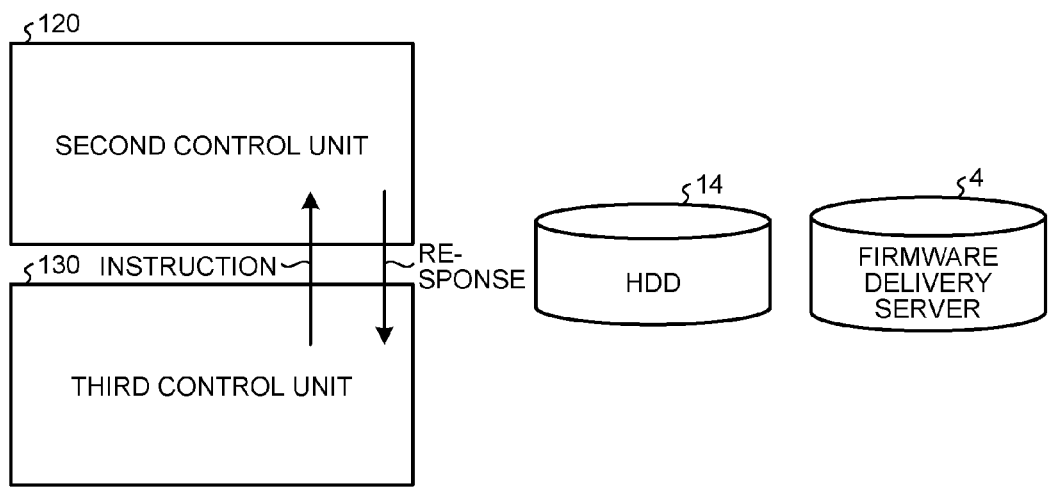
FIG. 19 is a diagram for illustrating the firmware updating process.

After the restarting of the operation unit 20 has been completed and the operation unit 20 and the main body 10 have been reconnected, the third control unit 130 instructs the second control unit 120 to introduce the second firmware again as illustrated in FIG. 19. The introduction of the second firmware to the operation unit 20 is completed at this stage. Thus, the second control unit 120, having received this instruction, immediately returns a response that indicates that the introduction of the second firmware has been completed to the third control unit 130. Having received this response, the third control unit 130 (first introduction control unit 134) restarts the main body 10 and makes settings for the files that cannot be altered while the OS is operating. This final step completes the introduction of the third firmware to the main body 10.

After the introduction of the first firmware to the MFP 1 has been completed as described above, the MFP 1 requests the validity determination again from the application server 3. Specifically, after the introduction of the first firmware to the MFP 1 has been completed, the determination request information transmission unit 114 transmits the determination request information to the application server 3 again. The module information included in the determination request information in this case represents the latest module information (though the application ID is the same as the last time). As described previously, the application server 3, having received the determination request information, performs the validity determination and transmits the determination result information indicating the result of the validity determination to the MFP 1.

Reference is made back to FIG. 4. The following resumes the description of FIG. 4. When the determination result information received by the determination result information reception unit 115 indicates that the application that is associated with the installation instruction attached to the pressed installation button 6 (in the present example, the application identified by the application ID included in the determination request information) can be used in the MFP 1, the application introduction control unit 118 performs control to introduce the application to the MFP 1.

Figure 20:
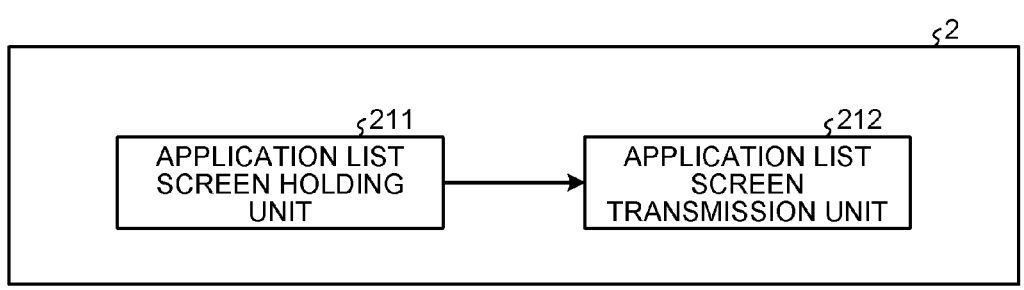
FIG. 20 is a diagram illustrating exemplary functions of an application market server.

The following describes exemplary functions of the application market server 2 with reference to FIG. 20. As illustrated in FIG. 20, the application market server 2 includes an application list screen holding unit 211 and an application list screen transmission unit 212. For convenience sake, FIG. 20 mainly illustrates functions relating to the present invention. Understandably, however, the application market server 2 may include additional functions.

The application list screen holding unit 211 holds the application list screen. The application list screen transmission unit 212, upon receipt of the display request from the MFP 1, transmits, to the MFP 1, the application list screen held by the application list screen holding unit 211 in response to the display request.

In the first embodiment, the function of the application list screen transmission unit 212 of the application market server 2 is achieved by the CPU 301 executing a computer program stored in, for example, the ROM 302. The function is not, however, limited to being achieved as described above. The function may be achieved by a dedicated hardware circuit (e.g., a semiconductor integrated circuit), for example. Additionally, the application list screen holding unit 211 described above is achieved by, for example, the ROM 302 or an auxiliary storage device such as an HDD. It is noted that the function of the application list screen transmission unit 212 may be considered to be achieved through the combination of the CPU 301 that executes the computer program and the communication I/F 304. For example, the function of the application list screen transmission unit 212 is achieved by the CPU 301 controlling the communication I/F 304 such that the application list screen is transmitted to the MFP 1.

Figure 21:
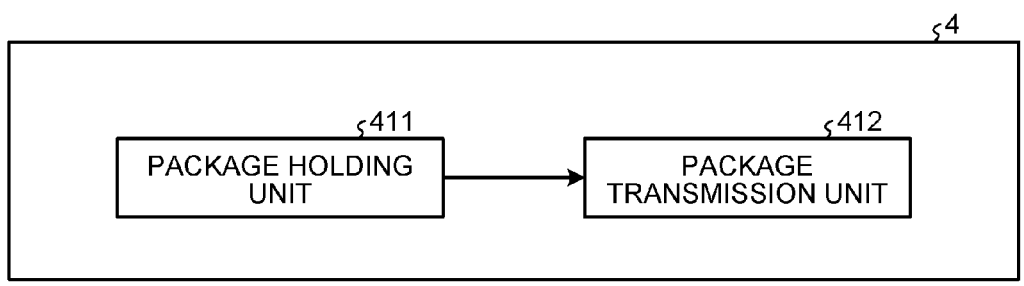
FIG. 21 is a diagram illustrating exemplary functions of the firmware delivery server.

The following describes exemplary functions of the firmware delivery server 4 with reference to FIG. 21. As illustrated in FIG. 21, the firmware delivery server 4 includes a package holding unit 411 and a package transmission unit 412. For convenience sake, FIG. 21 mainly illustrates functions relating to the present invention. Understandably, however, the firmware delivery server 4 may include additional functions.

The package holding unit 411 holds the latest version of package. The package transmission unit 412, upon receipt of the package request from the MFP 1, transmits, to the MFP 1, the latest version of package held by the package holding unit 411 in response to the package request.

In the first embodiment, the function of the package transmission unit 412 of the firmware delivery server 4 is achieved by the CPU 301 executing a computer program stored in, for example, the ROM 302. The function is not, however, limited to being achieved as described above. The function may be achieved by a dedicated hardware circuit (e.g., a semiconductor integrated circuit), for example. Additionally, the package holding unit 411 described above is achieved by, for example, the ROM 302 or an auxiliary storage device such as an HDD. It is noted that the function of the package transmission unit 412 may be considered to be achieved through the combination of the CPU 301 that executes the computer program and the communication I/F 304. For example, the function of the package transmission unit 412 is achieved by the CPU 301 controlling the communication I/F 304 such that the package is transmitted to the MFP 1.

Figure 22:
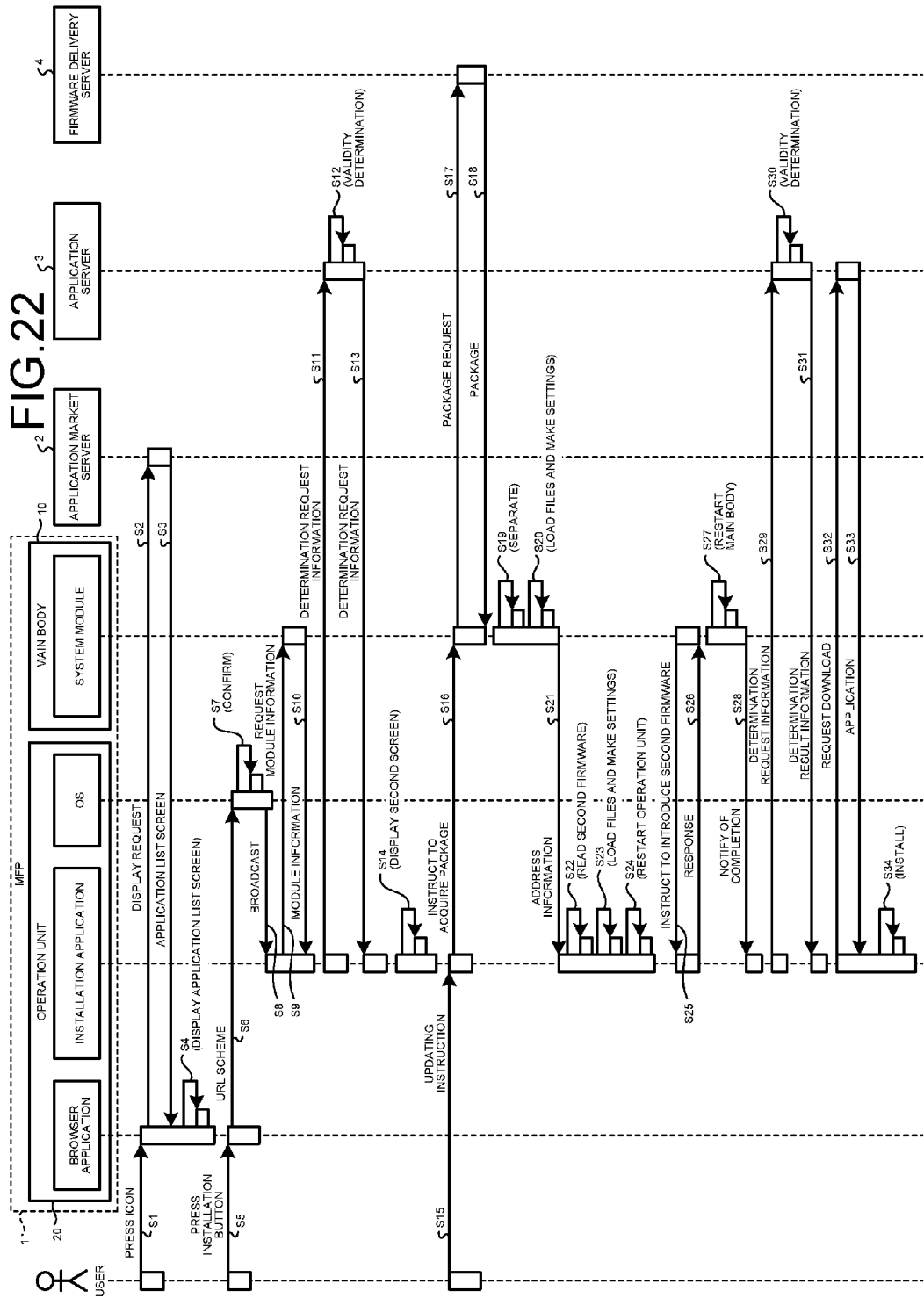
FIG. 22 is a diagram illustrating exemplary operation steps of the information processing system according to the first embodiment.

FIG. 22 is a sequence diagram illustrating exemplary operation steps of the information processing system 100 in the first embodiment. In the present example, the main body 10 includes a system module that controls a program. The function of the third control unit 130 is provided by this system module. When the user touches the icon 5 (see FIG. 5) on the operation screen (Step S1), the browser application transmits the display request to the application market server 2 (Step S2). The application list screen is then received from the application market server 2 as a response to the display request (Step S3) and the received application list screen is displayed on the operation panel 27 (Step S4).

When the user presses the installation button 6 of any of the applications on the application list screen (Step S5), the browser application notifies the OS of the operation unit 20 of the URL scheme attached to the installation button 6 (Step S6). The OS of the operation unit 20 confirms the notified URL scheme (Step S7) and broadcasts the URL scheme to the respective applications of the operation unit 20 (Step S8).

The installation application reacts to the broadcast URL scheme. The installation application requests the above-described module information from the system module of the main body 10 (Step S9) and, as a response to the request, receives the module information from the system module of the main body 10 (Step S10).

Then, the installation application (determination request information transmission unit 114) transmits, to the application server 3, the determination request information that includes the application ID included in the URL scheme (installation instruction selected from the application list screen) received from the OS of the operation unit 20 and the module information received at Step S10 (Step S11). The application server 3, having received the determination request information, performs the validity determination (Step S12) and transmits the determination result information that indicates the result of the validity determination to the installation application (Step S13).

When the received determination result information transmitted from the application server 3 indicates that the application identified by the application ID included in the determination request information cannot be used in the MFP 1, the installation application (first display unit 113) performs control to display the second screen (Step S14). When an instruction to update the firmware is received via the second screen (Step S15), the installation application (instruction unit 121) instructs the system module (second acquisition unit 131) of the main body 10 to acquire the latest version of package (Step S16). The system module (second acquisition unit 131), upon receipt of the foregoing instruction, transmits the package request to the firmware delivery server 4 (Step S17), acquires, as a response to this request, the latest version of package from the firmware delivery server 4, and stores the acquired latest version of package in the HDD 14 (Step S18).

The, the system module (separation unit 132) separates the latest version of package acquired at Step S18 into the second firmware and the third firmware (Step S19). The system module (first introduction control unit 134) loads program and data files that constitute the third firmware acquired through the separation at Step S19 and makes necessary settings (Step S20). It is noted that the main body 10 is not restarted at this stage.

The system module instructs the installation application to introduce the second firmware. As described previously, the system module (address information transmission unit 133) in the present example transmits, to the installation application, the address information that can identify the specific region in which the second firmware is stored in the HDD 14 (Step S21). The installation application (read unit 123) reads the second firmware from the region that is identified, in the HDD 14, by the address information received from the system module (Step S22). The installation application (second introduction control unit 124) loads program and data files that constitute the second firmware and makes necessary settings (Step S23). When the settings for files other than the files that cannot be altered while the OS is operating are completed, the operation unit 20 is restarted and settings are made for those files that cannot be altered while the OS is operating (Step S24). This step completes the introduction of the second firmware to the operation unit 20.

After the restarting of the operation unit 20 has been completed and the operation unit 20 and the main body 10 have been reconnected, the system module of the main body 10 instructs the installation application to introduce the second firmware again (Step S25). The introduction of the second firmware to the operation unit 20 is completed at this stage. Thus, the installation application, having received this instruction, immediately returns a response that indicates that the introduction of the second firmware has been completed to the system module (Step S26). Having received this response, the system module (first introduction control unit 134) restarts the main body 10 and makes settings for the files that cannot be altered while the OS is operating (Step S27). This step completes the introduction of the third firmware to the main body 10.

When the process of Step S27 is completed, the system module notifies the installation application that the introduction of the third firmware to the main body 10 has been completed (Step S28). Upon receipt of this notification, the installation application requests the validity determination from the application server 3 again. More specifically, the installation application reacquires the module information from the system module of the main body 10 and transmits to, the application server 3, the determination request information that includes the reacquired module information and an application ID for identifying the application that is associated with the installation instruction attached to the pressed installation button 6 (application ID included in the URL scheme attached to the installation button 6 pressed at Step S5) (Step S29). In the same manner as described above, the application server 3 that has received the determination request information performs the validity determination (Step S30) and transmits the determination result information that indicates the result of the validity determination to the installation application (Step S31).

When the determination result information received from the application server 3 indicates that the application that is identified by the application ID included in the determination request information can be used in the MFP 1, the installation application (application introduction control unit 118) requests the application server 3 to download the application (Step S32) and downloads the application from the application server 3 (Step S33). The installation application (application introduction control unit 118) then installs the downloaded application in the MFP 1 (Step S34).

As described above, when the installation button 6 included in the application list screen is pressed, the MFP 1 transmits, to the application server 3, the determination request information that requests the validity determination to determine whether the application associated with the installation instruction attached to the pressed installation button 6 can be used in the MFP 1. The application server 3, having received the determination request information from the MFP 1, performs the validity determination and transmits the determination result information that indicates the result of the validity determination to the MFP 1. When the determination result information received from the application server 3 as a response to the determination request information indicates that the application associated with the installation instruction attached to the pressed installation button 6 cannot be used in the MFP 1, the MFP 1 performs control to update the firmware that controls operation of the MFP 1. Thus, in the first embodiment, when the application that is associated with the installation instruction attached to the pressed installation button 6 cannot be used in the MFP 1, the firmware of the MFP 1 is automatically updated. This arrangement eliminates the need, which has been required in the known art, for the service technician to visit the site at which the MFP is installed and to update the firmware of the MFP, thus shortening the wait time on the part of the user. User convenience can thus be enhanced.

Modification of First Embodiment

The first embodiment has been described for a case in which the installation instruction is exemplarily used as the instruction to introduce the application to the MFP 1. The installation instruction to introduce the application to the MFP 1 is, however, illustrative only and is not intended to be in any way limiting. The instruction to introduce the application to the MFP 1 may still be, for example, an upgrading instruction that instructs to change over to the latest version of application (in other words, the instruction to introduce the latest version of application to the MFP 1).

Figure 23:
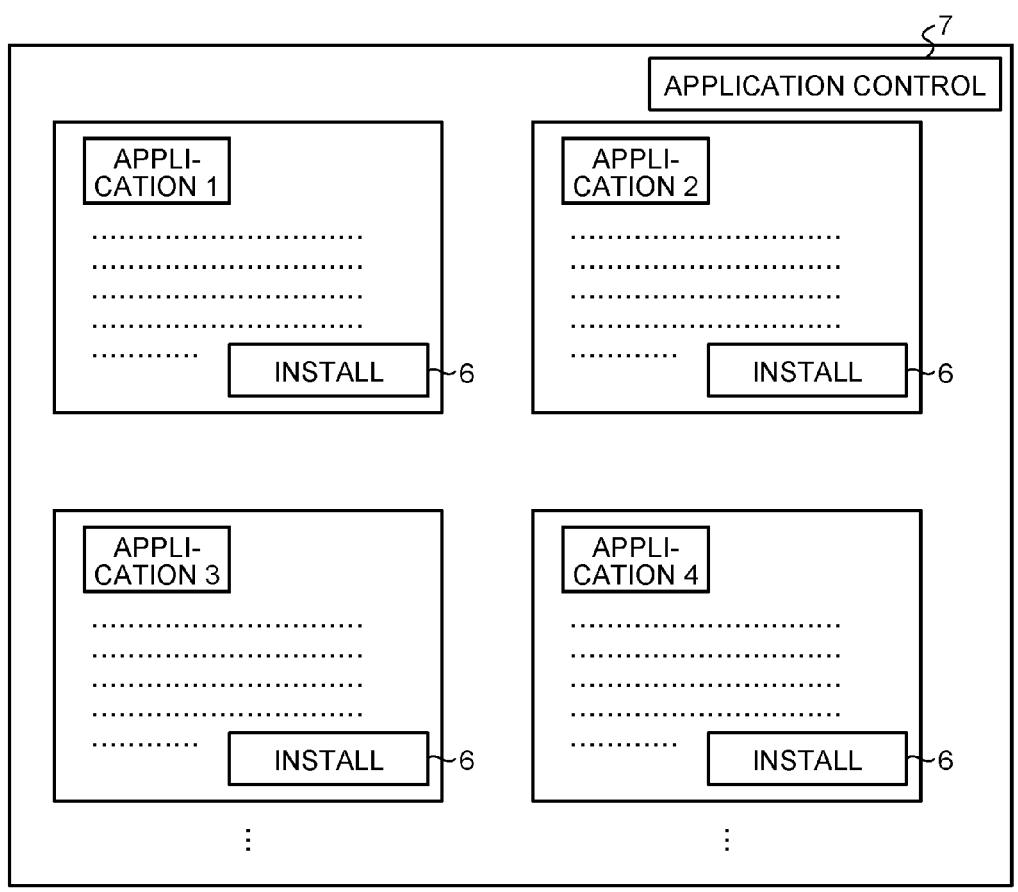
FIG. 23 is a diagram illustrating another exemplary application list screen.
Figure 24:
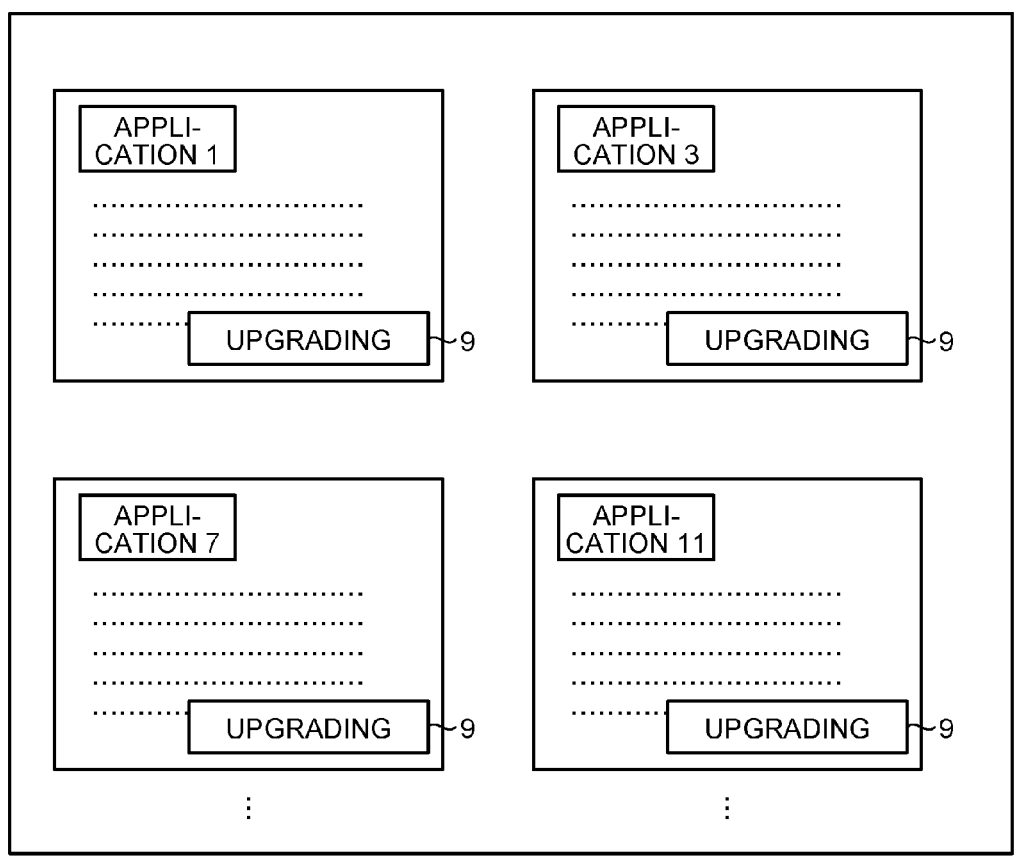
FIG. 24 is a diagram illustrating an exemplary upgrading screen.

As illustrated in FIG. 23, for example, the application list screen may display a button 7 for changing over to a screen through which upgrading is instructed (hereinafter referred to as an "application control button 7"). In the present example, the MFP 1 (first display unit 113), upon receipt of a press of the application control button 7, performs control to display an upgrading screen on the operation panel 27. As illustrated in FIG. 24, the upgrading screen displays, for each of the applications that can be upgraded, descriptive information that describes details of the application and a button 9 (hereinafter referred to as an "upgrading button 9") for instructing to upgrade the application. In the present example, a URL scheme that describes a procedure to execute an upgrading instruction is attached to the upgrading button 9. In the present example, the upgrading screen may be considered as a screen that includes an upgrading instruction as one example of an instruction to introduce the application to the MFP 1 and may be considered to correspond to the "first screen" in the claims.

The browser application loaded in the operation unit 20, upon receipt of the press of an upgrading button 9, notifies the OS of the operation unit 20 of the URL scheme attached to the upgrading button 9. The OS of the operation unit 20 confirms the notified URL scheme and broadcasts the URL scheme to the respective applications of the operation unit 20. The installation application reacts to this broadcast URL scheme. Steps that follow are the same as the steps described for the first embodiment.

The upgrading screen described above is illustrative only and may be configured otherwise. For example, the upgrading screen may display a button to instruct to collectively upgrade applications that can be upgraded and a URL scheme that represents a procedure to execute an upgrading instruction to collectively upgrade the upgradable applications may be attached to the button.

Another possible configuration is, for example, such that, instead of the upgrading screen described above, the application list screen is configured to display, for each of the applications, descriptive information that describes details of the application, the installation button 6 to which a URL scheme that describes a procedure to execute the installation instruction is attached, and the upgrading button 9 to which a URL scheme that describes a procedure to execute the upgrading instruction is attached.

Second Embodiment

Figure 25:
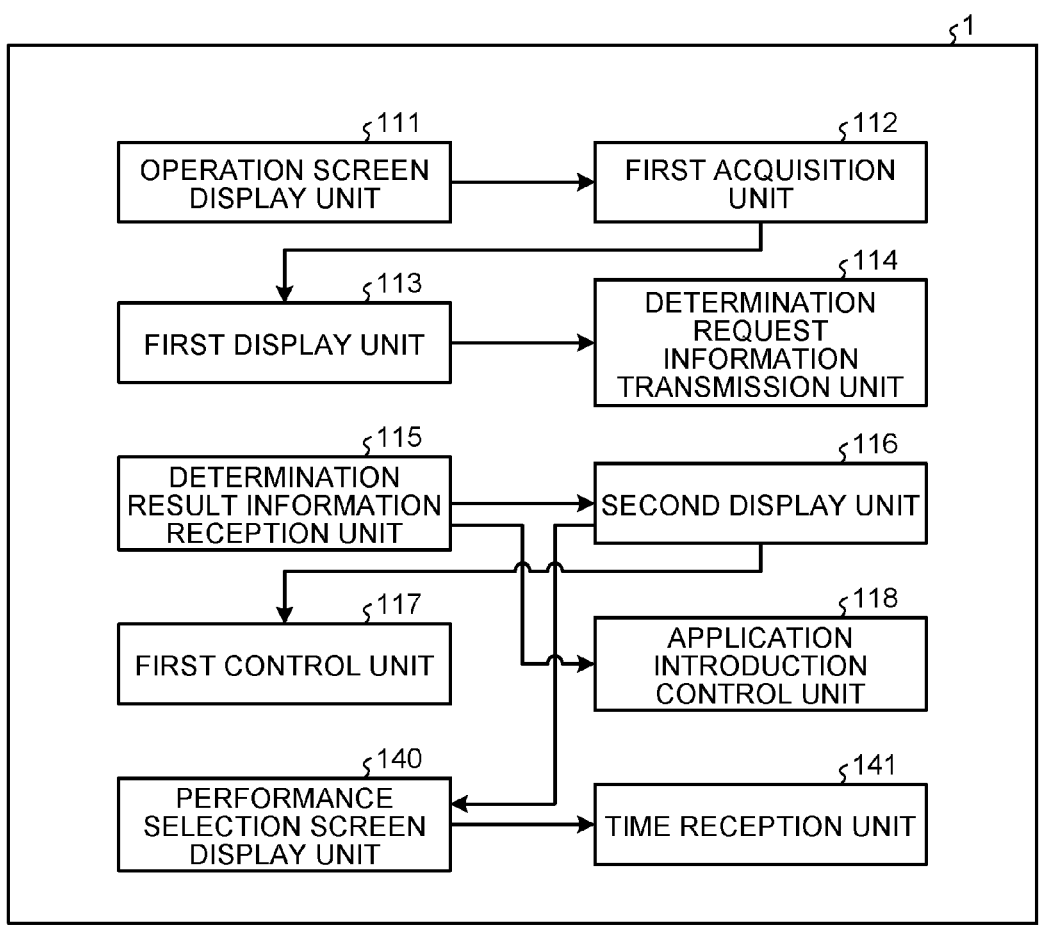
FIG. 25 is a diagram illustrating exemplary functions of an MFP according to a second embodiment.

The following describes a second embodiment. The following omits descriptions of portions common to the first embodiment as appropriate. FIG. 25 is a diagram illustrating exemplary functions of an MFP 1 according to the second embodiment. As illustrated in FIG. 25, the MFP 1 further includes a performance selection screen display unit 140 and a time reception unit 141. When an instruction to update the firmware is received via the second screen described previously, the time reception unit 141 receives specification of an updating time that indicates a specific time at which the firmware is to be updated.

Figure 26:
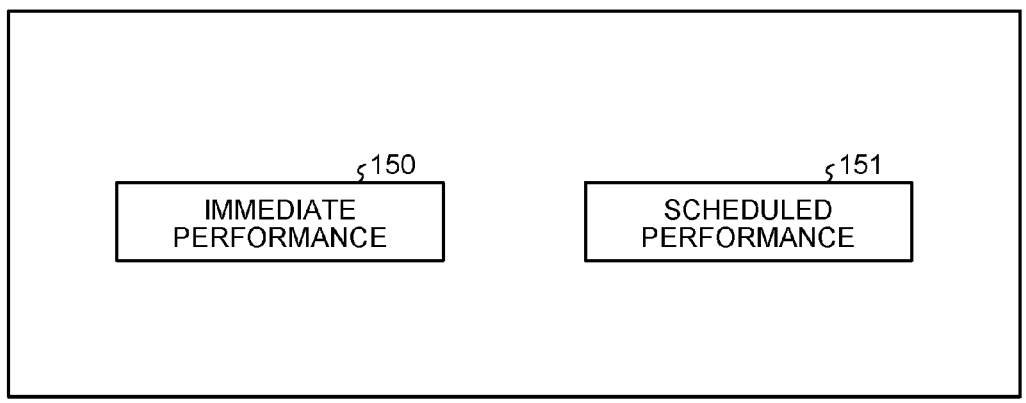
FIG. 26 is a diagram illustrating an exemplary performance selection screen.
Figure 27:
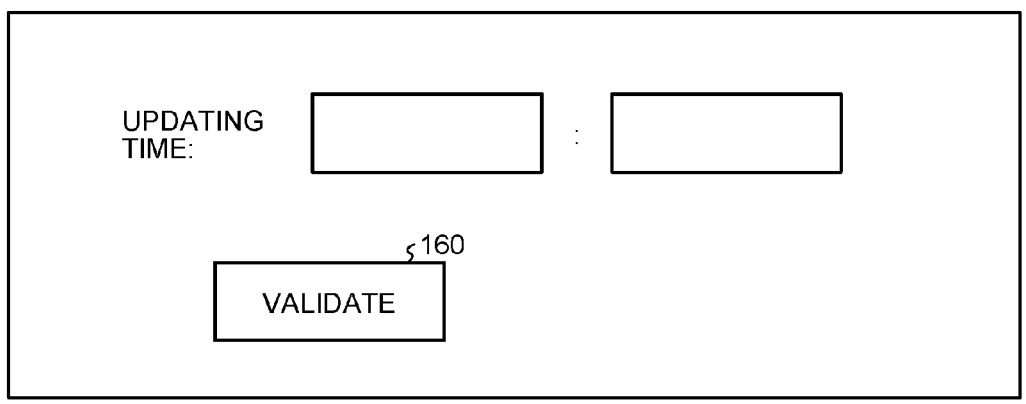
FIG. 27 is a diagram illustrating an exemplary time specification screen.

The performance selection screen display unit 140 serves the following function. Specifically, when an instruction to update the firmware is received via the second screen (when the "OK" button illustrated in FIG. 11 is pressed), for example, the performance selection screen display unit 140 performs control to display on an operation panel 27 a performance selection screen for selecting whether to update the firmware immediately or when the time specified to update the firmware arrives. FIG. 26 illustrates an exemplary performance selection screen. The performance selection screen includes a button 150 for specifying to immediately update the firmware (specifying immediate performance) and a button 151 for specifying to update the firmware when the specified time arrives (specifying scheduled performance). When the press of the button 150 is received, the firmware is updated immediately. Specific details of firmware updating are the same as those described for the first embodiment. When the press of the button 151 is received (when the instruction to update the firmware when the specified time arrives is received), the performance selection screen display unit 140 performs control to display, on the operation panel 27, a time specification screen as illustrated in FIG. 27 for specifying a specific time at which the firmware is to be updated. In the present example, the user inputs a desired time via the time specification screen and presses a "validate" button 160. This step inputs information that specifies the updating time that indicates the time at which the firmware is to be updated. The time reception unit 141 receives this input information. Specifically, the time reception unit 141 receives the time specified via the time specification screen as the updating time.

When the updating time received by the time reception unit 141 arrives, the first control unit 117 performs control to update the firmware. Specific details of firmware updating are the same as those described for the first embodiment.

FIG. 28 is a diagram illustrating, of operation steps of an information processing system 100 according to the second embodiment, portions specific to the second embodiment and different from the first embodiment. FIG. 28 assumes that the press of the button 151 for specifying the scheduled performance is received under a condition in which the performance selection screen is displayed on the operation panel 27 as a result of the reception of an instruction to update the firmware via the second screen at Step S15 of FIG. 22. Specifically, FIG. 28 assumes that the time specification screen is displayed on the operation panel 27. At Step S40 of FIG. 28, the user inputs the desired time via the time specification screen and presses the "validate" button 160. This step causes the installation application (time reception unit 141) to receive the specification of the updating time that indicates the time at which the firmware is to be updated. The installation application (instruction unit 121) instructs a system module (second acquisition unit 131) of a main body 10 to acquire the latest version of package when the updating time received at Step S40 arrives (Step S41). The system module (second acquisition unit 131), having received this instruction, checks time at regular intervals (Step S42) and, when the updating time notified from the installation application arrives, transmits the package request to a firmware delivery server 4 (Step S43). The system module (second acquisition unit 131) acquires, as a response to the package request transmitted at Step S43, the latest version of package from the firmware delivery server 4 and stores the acquired latest version of package in an HDD 14 (Step S44). Steps that follow are the same as the steps described for the first embodiment. In the present example, updating of the firmware can be considered to be started when the updating time arrives.

Time control, though it is performed on the side of the main body 10 in the present example, may still be performed on the side of an operation unit 20. For example, at Step S41, the installation application (instruction unit 121) may be configured to instruct the system module (second acquisition unit 131) of the main body 10 to acquire the latest version of package when the updating time received at Step S40 arrives.

The functions of the respective units (operation screen display unit 111, first acquisition unit 112, first display unit 113, determination request information transmission unit 114, determination result information reception unit 115, second display unit 116, first control unit 117, application introduction control unit 118, performance selection screen display unit 140, time reception unit 141) of the MFP 1 are achieved by the CPU (11 or 21) executing a computer program stored in a storage device (e.g., ROM 12, HDD 14, ROM 22, and flash memory 24). The functions are not, however, limited to being achieved as described above. At least a part of the functions of the respective units of the MFP 1 may be achieved by a dedicated hardware circuit (e.g., a semiconductor integrated circuit), for example.

It is noted that, of the functions of the first acquisition unit 112, the functions of transmitting the display request to the application market server 2 and of acquiring (receiving) the application list screen from the application market server 2 may be considered to be achieved through the combination of the CPU 21 that executes the computer program and the communication I/F 25. For example, to transmit the display request to the application market server 2, the CPU 21 controls the communication I/F 25 such that the display request is transmitted to the application market server 2. To receive the application list screen from the application market server 2, for example, the communication I/F 25 receives the application list screen from the application market server 2. Then, the communication I/F 25 notifies the CPU 21 of the application list screen received from the application market server 2. The CPU 21 can thereby detect reception of the application list screen. Similarly, the functions of the determination request information transmission unit 114 and the determination result information reception unit 115 are achieved through the combination of the CPU 21 and the communication I/F 25.

In the first and second embodiments described above, the main body 10 and the operation unit 20 operate independently of each other on the respective operating systems. This is, however, not the only possible arrangement and the main body 10 and the operation unit 20 may operate on the same operating system. Additionally, the application market server 2 and the application server 3 may even be integrated into a single server.

The program executed by the information processing system 100 (e.g., MFP 1, application market server 2, application server 3, and firmware delivery server 4) in the first and second embodiments may be recorded and provided in a computer-readable recording medium such as a CD-ROM, a flexible disk (FD), a CD-R, a digital versatile disc (DVD), and a universal serial bus (USB), as an installable or executable file. The program executed by the information processing system 100 in the first and second embodiments may be provided or distributed via a network such as the Internet. Alternatively, various programs may be provided by being incorporated in, for example, a ROM in advance.

The present invention can enhance user convenience.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing system comprising:
   an information processing apparatus; and
   a server connected to the information processing apparatus via a network;
   the information processing apparatus comprising:
      a first acquisition unit configured to acquire a first screen that includes a button to which an instruction to introduce an application to the information processing apparatus is attached;
      a first display unit configured to perform control to display the first screen acquired by the first acquisition unit;
      a determination request information transmission unit configured to, when the button is pressed, transmit, to the server, determination request information that requests a validity determination to determine whether the application associated with the instruction is able to be used in the information processing apparatus, before execution of the instruction attached to the pressed button;
      a determination result information reception unit configured to receive, from the server, determination result information that indicates a result of the validity determination; and
      a first control unit configured to, when the determination result information received by the determination result information reception unit indicates that the application associated with the instruction is not able to be used in the information processing apparatus, perform control to update firmware that controls operation of the information processing apparatus; and
   the server comprising:
      a determining unit configured to perform the validity determination when the determination request information is received from the information processing apparatus; and
      a determination result information transmission unit configured to transmit the determination result information that indicates a result of the validity determination to the information processing apparatus,
   wherein the determination request information includes application identification information that identifies the application associated with the instruction, module identification information that identifies a module that provides a function required for using the application, and version information that indicates a version value of the module loaded in the information processing apparatus,
   wherein the server further comprises a correspondence information storage unit that stores therein correspondence information that associates, for each of a plurality of pieces of application identification information having one-to-one correspondence to respective applications, the module identification information identifying a module that provides a function required for using the application identified by the application identification information with lower-limit version information that indicates a minimum of the version value of the module identified by the module identification information, and
   wherein the determining unit determines whether the application identified by the application identification information included in the determination request information is able to be used in the information processing apparatus based on the determination request information received from the information processing apparatus and the correspondence information stored in the correspondence information storage unit.

2. The information processing system according to claim 1, wherein the determining unit identifies, out of combinations of the pieces of application identification information and the pieces of module identification information included in the correspondence information, a specific combination that matches a combination of the application identification information and the module identification information included in the determination request information and, when the version value indicated by the lower-limit version information that is associated with the identified combination is greater than the version value indicated by the version information included in the determination request information, determines that the application identified by the application identification information included in the determination request information is not able to be used in the information processing apparatus.

3. The information processing system according to claim 2, wherein when the version value indicated by the lower-limit version information is equal to or smaller than the version value indicated by the version information included in the determination request information, the determining unit determines that the application identified by the application identification information included in the determination request information is able to be used in the information processing apparatus.

4. The information processing system according to claim 1, wherein when the determination result information received by the determination result information reception unit indicates that the application associated with the instruction is not able to be used in the information processing apparatus, the first control unit performs control to introduce first firmware indicative of a latest version of the firmware to the information processing apparatus.

5. The information processing system according to claim 4, wherein the information processing apparatus further comprises:
an operation unit configured to receive operation; and
a main body configured to operate in accordance with the operation received by the operation unit, and
the first firmware includes second firmware that indicates a latest version of operation unit firmware for controlling operation of the operation unit and third firmware that indicates a latest version of main body firmware for controlling operation of the main body.

6. The information processing system according to claim 5, wherein the first control unit includes:
a second control unit configured to perform control to introduce the second firmware to the operation unit; and
a third control unit configured to perform control to introduce the third firmware to the main body.

7. The information processing system according to claim 6, wherein
the third control unit includes:
a second acquisition unit configured to acquire a package in which the second firmware and the third firmware are combined, and store the acquired package in a storage unit;
a separation unit configured to separate the package acquired by the second acquisition unit into the second firmware and the third firmware;
an address information transmission unit configured to transmit, to the second control unit, address information that identifies a specific region in which the second firmware is stored in the storage unit; and
a first introduction control unit configured to perform control to introduce the third firmware to the main body; and
the second control unit includes:
an address information reception unit configured to receive the address information from the third control unit;
a read unit configured to read the second firmware from the region identified by the address information received by the address information reception unit in the storage unit; and
a second introduction control unit configured to perform control to introduce the second firmware read by the read unit to the operation unit.

8. The information processing system according to claim 7, wherein the second control unit further includes an instruction unit configured to, when the determination result information received by the determination result information reception unit indicates that the application that is associated with the instruction is not able to be used in the information processing apparatus, instruct the third control unit to acquire a latest version of the package.

9. The information processing system according to claim 6, wherein
the operation unit includes the second control unit, and
the main body includes the third control unit.

10. The information processing system according to claim 1, wherein the determination request information transmission unit retransmits the determination request information to the server after completion of the control performed by the first control unit.

11. The information processing system according to claim 1, wherein
the information processing apparatus further includes a second display unit configured to perform control to display a second screen for receiving an instruction as to whether to update the firmware when the determination result information received by the determination result information reception unit indicates that the application that is associated with the instruction is not able to be used in the information processing apparatus, and
the first control unit performs control to update the firmware when an instruction to update the firmware is received via the second screen.

12. The information processing system according to claim 11, wherein
the information processing apparatus further includes a time reception unit configured to, when an instruction to update the firmware is received via the second screen, receive specification of an updating time that indicates a specific time at which the firmware is to be updated, and
the first control unit performs control to update the firmware when the time indicated by the updating time received by the time reception unit arrives.

13. The information processing system according to claim 12, wherein
the information processing apparatus further includes a performance selection screen display unit configured to, when an instruction to update the firmware is received via the second screen, perform control to display a performance selection screen for selecting whether to update the firmware immediately or when the time specified to update the firmware arrives, and
when an instruction to update the firmware when the specified time arrives is received, the performance selection screen display unit performs control to display a time specification screen for specifying a specific time at which the firmware is to be updated.

14. The information processing system according to claim 13, wherein the time reception unit receives, as the updating time, a time specified via the time specification screen.

15. The information processing system according to claim 1, wherein
the information processing apparatus further includes an application introduction control unit configured to, when the determination result information received by the determination result information reception unit indicates that the application that is associated with the instruction is able to be used in the information processing apparatus, perform control to introduce the application to the information processing apparatus.

16. An information processing method performed by an information processing system that includes an information processing apparatus and a server connected to the information processing apparatus via a network, the information processing method comprising:
by the information processing apparatus,
acquiring a first screen that includes a button to which an instruction to introduce an application to the information processing apparatus is attached;
performing control to display the first screen acquired at the acquiring;
transmitting, when the button is pressed, transmitting, to the server, determination request information that requests a validity determination to determine whether the application associated with the instruction is able to be used in the information processing apparatus, before execution of the instruction attached to the pressed button;

receiving, from the server, determination result information that indicates a result of the validity determination; and when the determination result information received at the receiving indicates that the application associated with the instruction is not able to be used in the information processing apparatus, performing control to update firmware that controls operation of the information processing apparatus; and by the server, performing the validity determination when the determination request information is received from the information processing apparatus; and transmitting the determination result information that indicates a result of the validity determination to the information processing apparatus, wherein the determination request information includes application identification information that identifies the application associated with the instruction, module identification information that identifies a module that provides a function required for using the application, and version information that indicates a version value of the module loaded in the information processing apparatus, wherein the method further includes storing correspondence information that associates, for each of a plurality of pieces of application identification information having one-to-one correspondence to respective applications, the module identification information identifying a module that provides a function required for using the application identified by the application identification information with lower-limit version information that indicates a minimum of the version value of the module identified by the module identification information; and wherein the method further includes determining whether the application identified by the application identification information included in the determination request information is able to be used in the information processing apparatus based on the determination request information received from the information processing apparatus and the correspondence information.

17. An information processing apparatus connectable to a server via a network, the information processing apparatus comprising:

a first acquisition unit configured to acquire a first screen that includes a button to which an instruction to introduce an application to the information processing apparatus is attached;

a first display unit configured to perform control to display the first screen acquired by the first acquisition unit;

a determination request information transmission unit configured to, when the button is pressed, transmit, to the server, determination request information that requests a validity determination to determine whether the application associated with the instruction is able to be used in the information processing apparatus, before execution of the instruction attached to the pressed button;

a determination result information reception unit configured to receive, from the server, determination result information that indicates a result of the validity determination; and a first control unit configured to, when the determination result information received by the determination result information reception unit indicates that the application associated with the instruction is not able to be used in the information processing apparatus, perform control to update firmware that controls operation of the information processing apparatus, wherein the determination request information includes application identification information that identifies the application associated with the instruction, module identification information that identifies a module that provides a function required for using the application, and version information that indicates a version value of the module loaded in the information processing apparatus, wherein the server further comprises a correspondence information storage unit that stores therein correspondence information that associates, for each of a plurality of pieces of application identification information having one-to-one correspondence to respective applications, the module identification information identifying a module that provides a function required for using the application identified by the application identification information with lower-limit version information that indicates a minimum of the version value of the module identified by the module identification information, and wherein the determining unit determines whether the application identified by the application identification information included in the determination request information is able to be used in the information processing apparatus based on the determination request information received from the information processing apparatus and the correspondence information stored in the correspondence information storage unit.

* * * * *